(12) United States Patent
Stubler et al.

(10) Patent No.: US 8,307,725 B2
(45) Date of Patent: Nov. 13, 2012

(54) SYSTEM FOR OBTAINING INFORMATION RELATING TO A PIPE, AND ASSOCIATED METHOD

(75) Inventors: Jerome Stubler, Paris (FR); Bernard Basile, Paris (FR); Gilles Hovhanessian, Antony (FR)

(73) Assignee: Soletanche Freyssinet, Rueil Malmaison (FR)

( * ) Notice: Subject to any disclaimer, the term of this patent is extended or adjusted under 35 U.S.C. 154(b) by 120 days.

(21) Appl. No.: 12/989,040

(22) PCT Filed: Apr. 17, 2009

(86) PCT No.: PCT/FR2009/050723
§ 371 (c)(1),
(2), (4) Date: Oct. 21, 2010

(87) PCT Pub. No.: WO2009/138646
PCT Pub. Date: Nov. 19, 2009

(65) Prior Publication Data
US 2011/0036148 A1 Feb. 17, 2011

(30) Foreign Application Priority Data

Apr. 22, 2008 (FR) ...................................... 08 52712

(51) Int. Cl.
*G01M 19/00* (2006.01)
(52) U.S. Cl. ..................................................... 73/865.8
(58) Field of Classification Search .................. None
See application file for complete search history.

(56) References Cited

U.S. PATENT DOCUMENTS

| 2,940,302 | A | 6/1960 | Scherbatskoy | |
|---|---|---|---|---|
| 4,485,668 | A | 12/1984 | Hudson et al. | |
| 4,747,317 | A | 5/1988 | Lara | |
| 5,203,646 | A | 4/1993 | Landsberger | |
| 6,243,657 | B1 * | 6/2001 | Tuck et al. | 702/150 |
| 7,548,059 | B2 * | 6/2009 | Thompson et al. | 324/220 |
| 2008/0204008 | A1 * | 8/2008 | Paulson | 324/220 |

FOREIGN PATENT DOCUMENTS

| EP | 0442626 A2 | 8/1991 |
|---|---|---|
| EP | 0450814 A1 | 10/1991 |
| EP | 0862682 | 9/1998 |
| FR | 2556832 A1 | 6/1985 |
| GB | 2379015 A | 2/2003 |
| JP | 60-257338 A | 12/1985 |
| WO | WO 97/42691 | 11/1997 |
| WO | WO 98/12418 | 3/1998 |

* cited by examiner

*Primary Examiner* — Robert R Raevis
(74) *Attorney, Agent, or Firm* — McKenna Long & Aldridge LLP

(57) ABSTRACT

The invention proposes a system for obtaining information relating to a pipe (4) conveying a flow of fluid (28), and/or relating to the fluid. This system comprises a module (1;30) comprising means (10) of acquiring data, subsequent analysis of which makes it possible to obtain information relating to the pipe and/or the fluid, and means (11) of storing the data which said data acquisition means acquire, the self-contained module being arranged to be pushed by the fluid flow after being introduced into the pipe. It also comprises a mechanical link (2) which is connected to the self-contained module and accessible from outside the pipe.

17 Claims, 14 Drawing Sheets

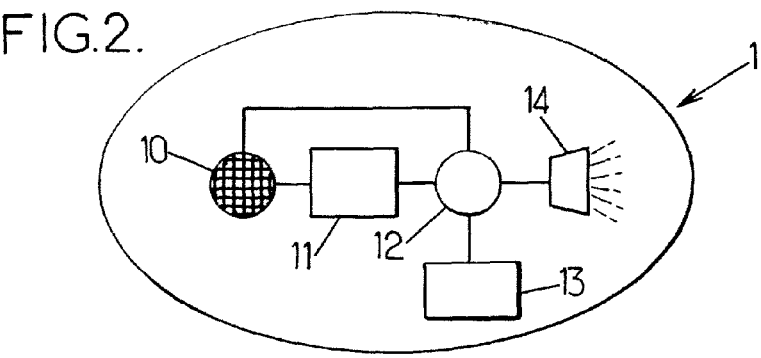
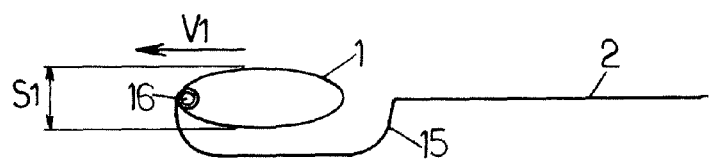
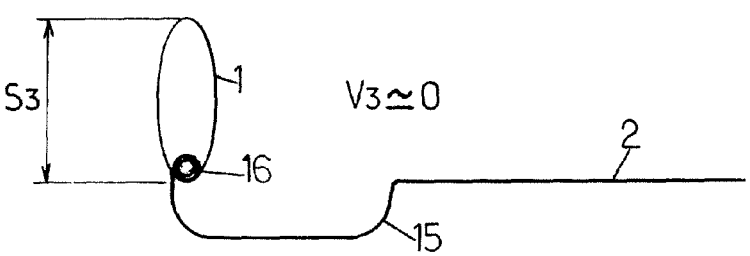
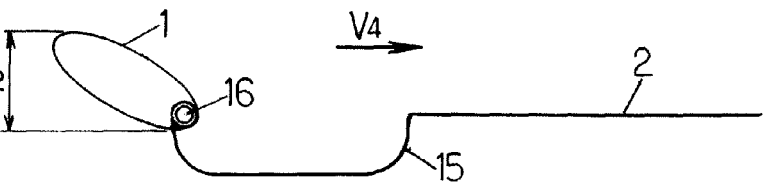
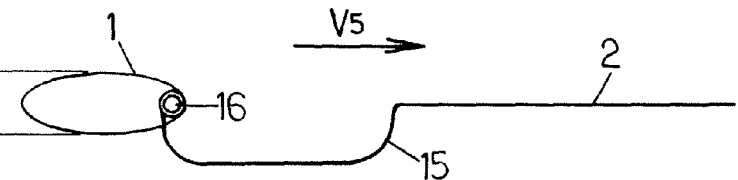

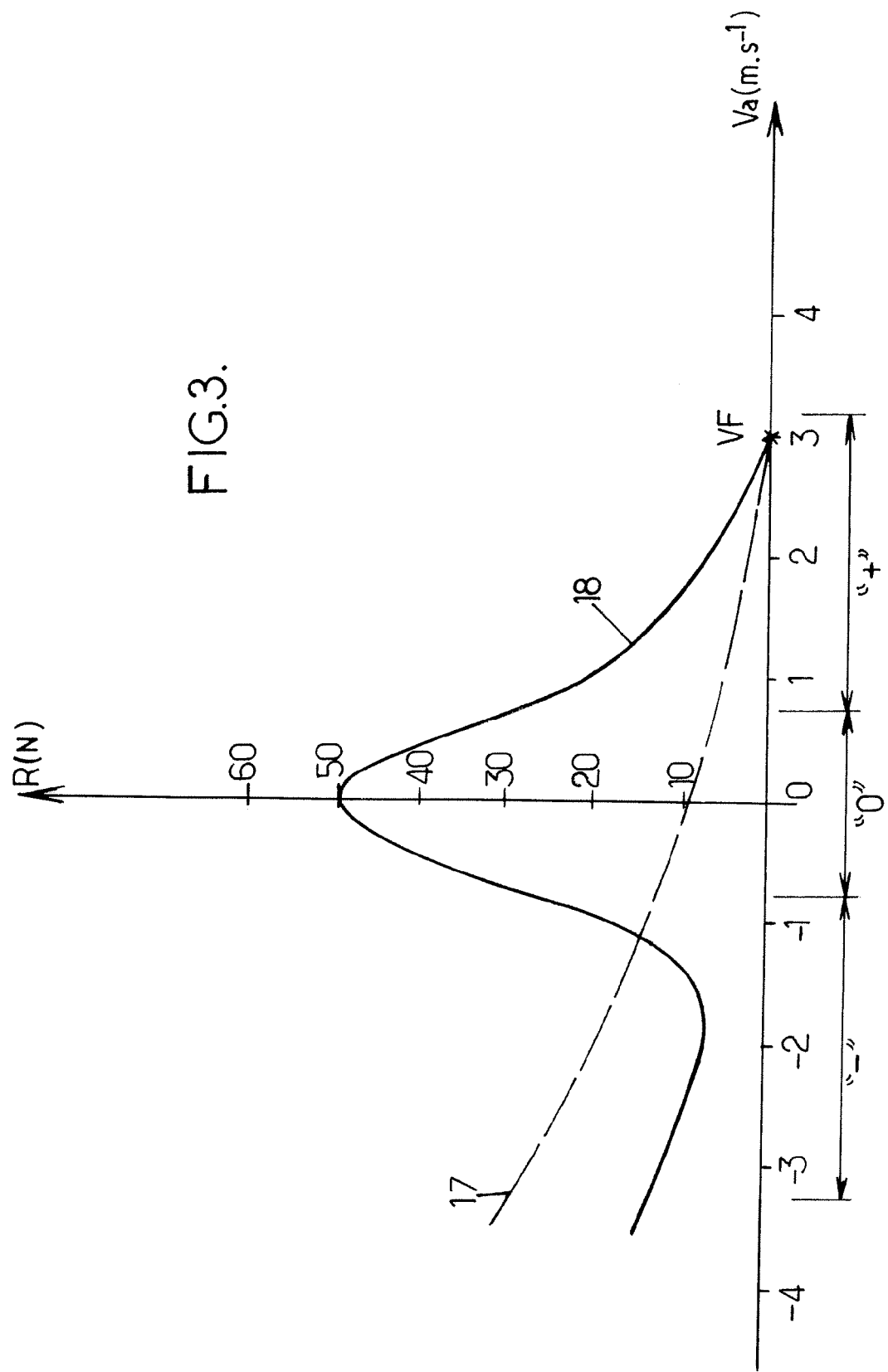

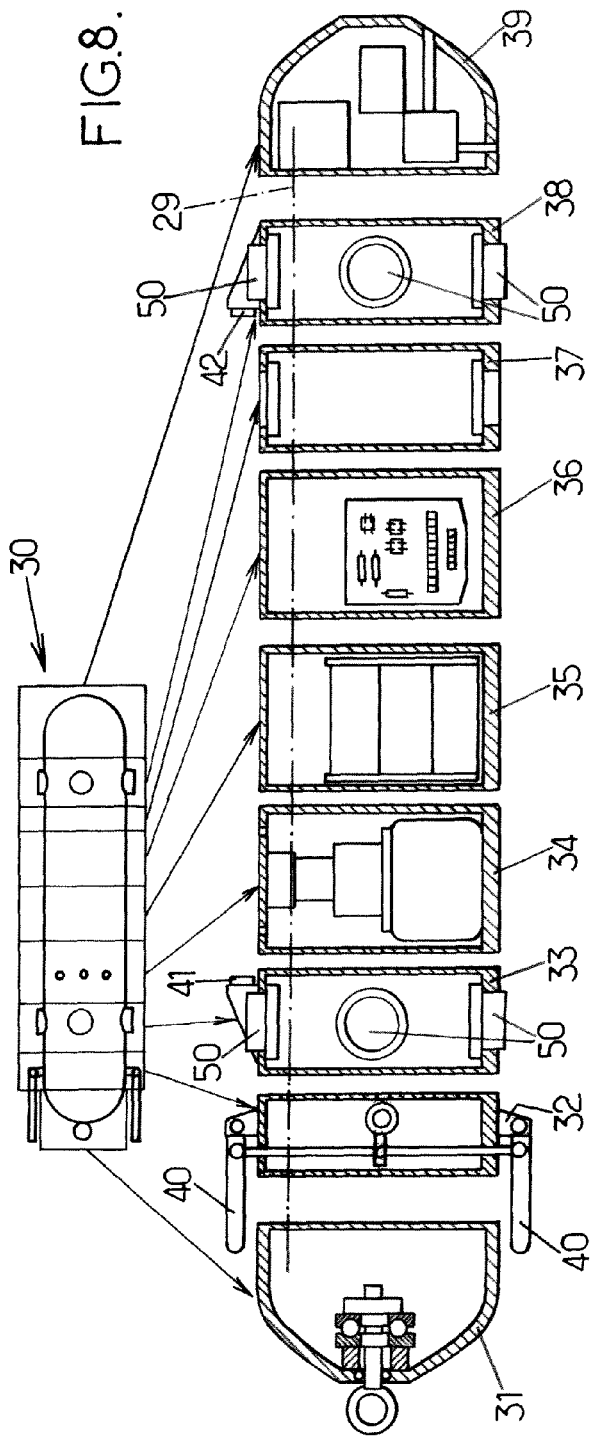
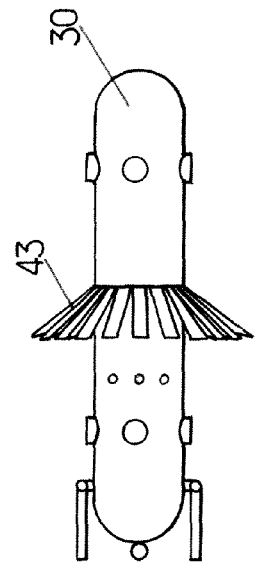
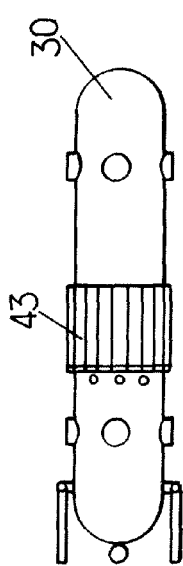

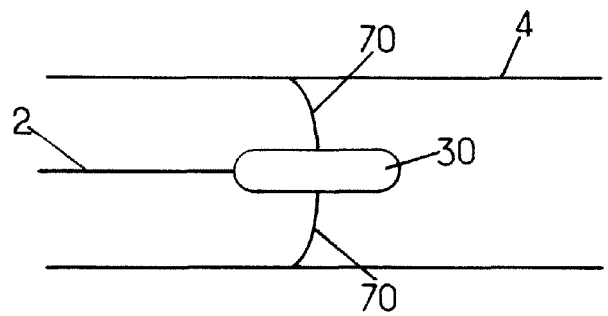
FIG.19.
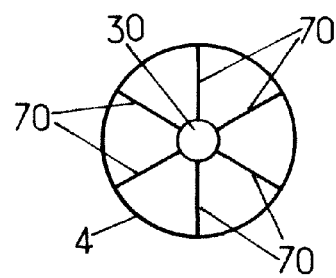
FIG.20.
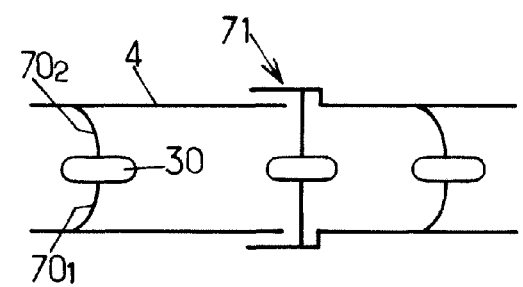
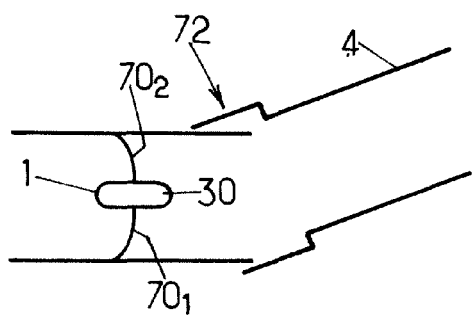
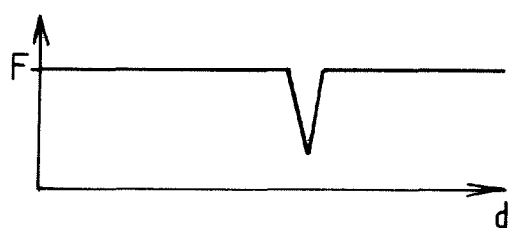
FIG.21.
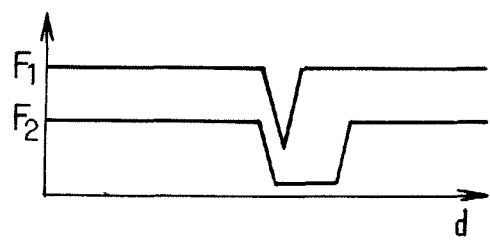
FIG.22.

SYSTEM FOR OBTAINING INFORMATION RELATING TO A PIPE, AND ASSOCIATED METHOD

This application is a 35 U.S.C. §371 National Stage entry of International

Application No. PCT/FR2009/050723, filed on Apr. 17, 2009, and claims priority to French Application No. 08 52712, filed on Apr. 22, 2008 in France, the contents of each of which is hereby incorporated by reference in its entirety as if fully set forth herein.

1. Field of the Invention

This invention relates to obtaining information relating to a pipe conveying a flow of fluid, and/or relating to the fluid.

2. Background of the Invention

This information can relate, non-exclusively, to leak detection in the pipe and/or detection of characteristics of said pipe or of the fluid.

For leak detection for example, analysing the noise caused by this leak inside the pipe is known.

According to the Sahara (registered trade mark) solution, developed by the company WRc, an acoustic sensor is introduced into the pipe under consideration via an access point, then circulates inside the pipe, pushed by the fluid flow.

A cable is linked by one of its ends to this acoustic sensor. It allows, on the one hand, transmission in real time of the acoustic data captured by the acoustic sensor to an analysis system situated at its other end, and on the other hand supply of the necessary electrical energy to power the acoustic sensor.

The position of the acoustic sensor is moreover monitored at all times, in the course of its circulation inside the pipe, by measuring the length of the cable introduced into this pipe following the acoustic sensor, and by an operator at the surface, equipped with an appropriate system, detecting a signal transmitted by the acoustic sensor.

Real time analysis of the captured acoustic data and continuous tracking of the acoustic sensor thus make it possible to detect a possible leak of fluid in the pipe, as well as its geographical position.

Because of its characteristics recalled above, the cable connected to the acoustic sensor must be of an appropriate type, and have a relatively significant diameter and therefore stiffness.

Now, the need for such a diameter generates significant friction of the cable against the fluid and the inside of the pipe, particularly in the non-linear sections of the pipe.

Consequently, it limits the maximum length of cable which can be inserted into the pipe to about 1 km. Beyond this length, in fact, it is considered that the force generated by the friction of the cable in the pipe becomes greater than the propulsive force of the acoustic sensor resulting from the speed of the fluid, which prevents the progress of the acoustic sensor inside the pipe.

SUMMARY OF THE INVENTION

An object of this invention is to make it possible to obtain information about a pipe, while limiting the above-mentioned disadvantages.

The invention thus proposes a system for obtaining information relating to a pipe conveying a flow of fluid, and/or relating to the fluid. This system comprises:
 a module which is self-contained in terms of data storing and energy supply, comprising means of acquiring data, subsequent analysis of which makes it possible to obtain information relating to the pipe and/or the fluid, and means of storing the data acquired by said data acquisition means, the self-contained module being arranged to be pushed by the fluid flow after being introduced into the pipe, and
 a mechanical link which is connected to the self-contained module and accessible from outside the pipe, said mechanical link having no properties for transmitting the data which the self-contained module acquires to outside the pipe, and for supplying energy to the self-contained module from outside the pipe.

Use of a self-contained module, that is a module which does not require external aid to acquire and store data, or to be supplied with energy, makes it possible to do without a voluminous cable such as that of the Sahara solution described in the introduction.

A simple mechanical link, having no properties enabling it to transmit the data which the self-contained module acquires to outside the pipe, or for supplying energy to the self-contained module from outside the pipe, is enough. Such a mechanical link, because of its small cross-section, can be much longer than the cable of the Sahara solution, without interfering with the progress of the self-contained module inside the pipe.

It also gives the same advantages as the cable of the Sahara solution, such as allowing easy location of the self-contained module inside the pipe, thanks to monitoring the length of the mechanical link which is introduced following the self-contained module into the pipe, as well as easy recovery of the self-contained module, simply by pulling the mechanical link from outside the pipe.

Subsequent analysis of the data stored by the self-contained module, after it leaves the pipe, makes it possible to establish a completely reliable diagnostic. This analysis can relate to a large portion of the pipe, on the basis of a single acquisition/storing of data by the self-contained module, because of the length of the mechanical link which is used.

According to other embodiments, which can be combined in all conceivable ways:
 the data acquisition means include acoustic data acquisition means;
 the self-contained module includes means of transmitting and/or receiving signals;
 the self-contained module includes means of generating, after being introduced into the pipe, a signal such as a noise, which is suitable for being captured from outside the pipe by an appropriate means;
 the means for storing data acquired by said data acquisition means include a miniature removable medium;
 the self-contained module includes a rechargeable battery or any other type of on-board current generation system;
 the self-contained module includes means of measuring the tensile stress between the self-contained module and the mechanical link;
 the self-contained module includes means of detecting position relative to at least one internal wall of the pipe;
 the self-contained module includes means of movement in the direction of the height and/or width of the pipe;
 the self-contained module includes means of generating a shock wave in the direction of the wall of the pipe, and of measuring its vibratory response;
 the self-contained module includes one or more flexible rods which are bent when they rest on the internal wall of the pipe; analysis of the deformation of these flexible rods may, for example, make it possible to obtain characteristics of roughness, opening of joints, and/or profile of the inside of the pipe;

the self-contained module includes at least one of: an inertial unit, means of measuring pressure, means of measuring speed and a magnetometer;

the self-contained module includes an internal clock, which is synchronised with an external clock outside the pipe and used as a time reference;

the self-contained module is arranged so that after it is introduced into the pipe, the fluid flow offers it variable resistance as a function of its speed relative to the fluid; for example, the fluid flow offers it maximum resistance when its speed is close to zero;

the self-contained module is arranged to present a maximum transverse surface to the fluid flow when its speed is close to zero;

the self-contained module is articulated relative to the mechanical link by the use of a spring, in such a way as to present a maximum transverse surface to the fluid flow when its speed is close to zero;

the self-contained module includes surface elements on the periphery of a body of the self-contained module, the surface elements being able to place themselves approximately against the body of the self-contained module when the speed of the self-contained module is not close to zero, and to place themselves in a deployed manner relative to the body of the self-contained module when the speed of the self-contained module is close to zero;

the self-contained module includes passages for the fluid, and a mobile distribution element which is arranged to leave open at least some of said passages when the speed of the self-contained module is not close to zero, and to close at least some of said passages when the speed of the self-contained module is close to zero;

the self-contained module is of an appreciably elongated shape;

the self-contained module can be decomposed into near sub-modules, which may be concatenated by a link which can carry energy and information, to make it easier for it to take curves;

the self-contained module and/or the mechanical link has a density of the same order as that of the fluid;

the mechanical link is arranged to limit the friction forces with the fluid and/or the inside of the pipe;

the mechanical link is equipped with means so that when it is inside the pipe, the fluid flow offers it variable resistance as a function of its speed relative to the fluid; for example, this resistance can be maximum when its speed is close to zero;

the mechanical link includes surface elements which are able to place themselves approximately against the mechanical link when the speed of the mechanical link is not close to zero, and to place themselves in a deployed manner relative to the mechanical link when the speed of the mechanical link is close to zero;

the length of the mechanical link is of the order of approximately ten kilometres;

the system also includes pushing means (rollers, belts, which may be notched, or other) to introduce the mechanical link into the pipe, in such a way as to overcome the stresses resulting from the friction of the mechanical link against the pipe; corresponding pulling means can be used to extract the mechanical link from the pipe;

the pushing means are divided into two stages, one to deliver the mechanical link, the other to introduce it into the pipe, it being possible to use an intermediate lock chamber; a servo system between the stages is also conceivable;

the system also includes means of disinfecting the mechanical link upstream of its introduction into the pipe;

the self-contained module includes means of analysing the vibratory response of the pipe, e.g. to obtain the stiffness characteristics of this pipe;

the system includes means of measuring the length of the mechanical link which is introduced into the pipe as the self-contained module is pushed by the fluid flow, and/or means of measuring the length of the mechanical link which is extracted from the pipe by traction; and/or the system includes means of measuring the tension of the mechanical link in the extraction system; this information, coupled with measurement of the achieved tension on the side of the self-contained module, makes it possible subsequently and by iteration to measure the friction of the mechanical link against the pipe, and to know more precisely the elongation of the mechanical link, which makes it possible to improve the precision of location.

The invention also proposes a method of obtaining information relating to a pipe and/or relating to the fluid conveying a fluid flow, using a system according to any one of the preceding claims. The method includes the following steps:

introducing into the pipe a module which is self-contained in terms of data storing and energy supply, comprising means of acquiring data, subsequent analysis of which makes it possible to obtain information relating to the pipe and/or the fluid, and means of storing the data which said data acquisition means acquire, a mechanical link which is accessible from outside the pipe being connected to the self-contained module, said mechanical link having no properties for transmitting the data which the self-contained module acquires to outside the pipe, and for supplying energy to the self-contained module from outside the pipe; and acquiring the data using said data acquisition means and storing said data using said storing means, while the self-contained module is pushed by the fluid flow.

Advantageously, the self-contained module is finally made to leave the pipe by pulling on the mechanical link.

The self-contained module may be able to carry out another acquisition/storing of data when it is extracted from the pipe. It can supplement the data acquisition/storing which is carried out while the self-contained module is pushed by the fluid flow, making it possible to have redundant data, which is likely to improve the reliability of the obtained information. As a variant, it can replace the data acquisition/storing which is carried out while the self-contained module is pushed by the fluid flow.

The information which is obtained about the pipe can relate to detection of a leak in said pipe. As a variant or in addition, it can relate to characteristics of said pipe such as diameter, ovality, internal fouling, internal furring, discontinuity of an internal surface of the pipe, coherence of surrounding ground, opening of joints, profile in plan and/or elevation, the presence of a magnetic element, internal pressure, and/or speed of fluid flow. It can also include information which makes it possible to detect the structural state of the pipe.

The information which is obtained relating to the fluid, in addition to or replacing the information which is obtained relating to the pipe, can relate to the measurement of hydraulic parameters and/or the quality of the transported fluid. It can also include at least one of: chlorine concentration, pH, fluid temperature, etc.

When information is obtained relating to the pipe and the fluid, obtaining the two types of information can be either simultaneous and combined or independent.

BRIEF DESCRIPTION OF THE DRAWINGS

Other features and advantages of this invention will appear in the description below of non-limiting exemplary embodiments, referring to the attached drawings, in which:

FIG. 2 is a diagram showing an example of a self-contained module and the elements which it is likely to incorporate;

FIG. 3 is a graphic showing two curves related to possible behaviours for a self-contained module in a pipe;

FIGS. 4a-4e are diagrams showing an advantageous example of configuration for a self-contained module, at different speeds;

FIG. 8 is a diagram showing another example of a system according to the invention;

FIGS. 9a-9b are diagrams showing an advantageous example of a self-contained module equipped with scales, in the closed and open positions respectively;

FIGS. 19 and 20 are respectively a side view and a front view of an arrangement in which the self-contained module is equipped with flexible rods;

FIG. 21 is a diagram showing a variation of the bending of the on-board flexible rods on a self-contained module when it passes a joint of the pipe;

FIG. 22 is a diagram showing a variation of the bending of the on-board flexible rods on a self-contained module when it passes a dislocation of the pipe.

DESCRIPTION OF PREFERRED EMBODIMENTS

Figure 1:
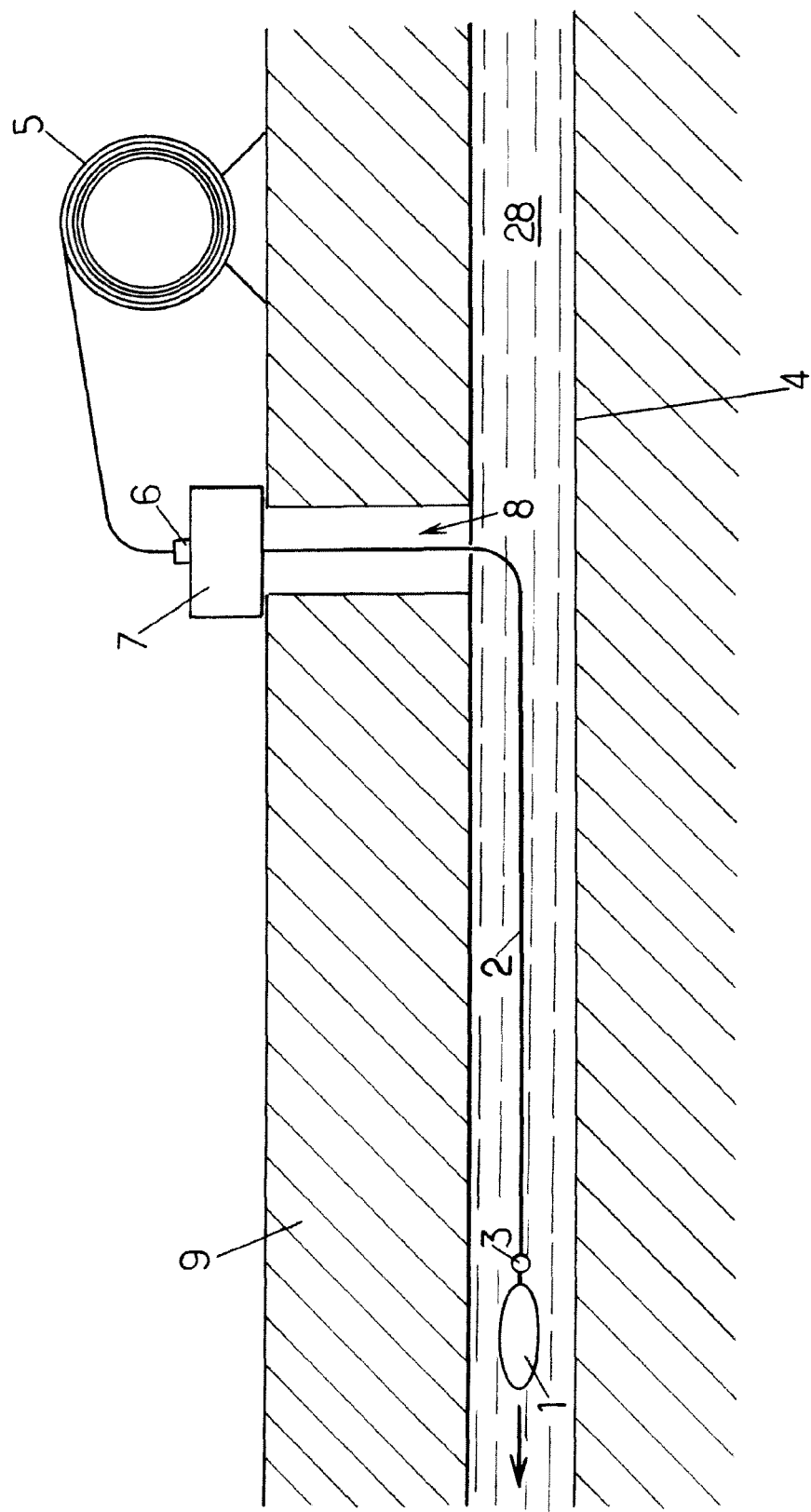
FIG. 1 is a diagram showing an example of a system according to the invention.

FIG. 1 shows an example of a system for obtaining information relating to a pipe 4 conveying a fluid flow 28.

The pipe 4 can be of any type. For example, it can contain, as fluid, water or any other liquid, gas, etc. It can have various shapes and dimensions. In particular, its diameter can vary as a function of the application in which it participates. The system can advantageously be adapted as a function of the characteristics of the pipe 4.

A simple linear section of the pipe 4 is shown in FIG. 1. But this does not exclude the possibility for the pipe 4 of having angles, bends, or deviations on its route.

Similarly, the shown pipe 4 is buried under the ground 9. But it is of course conceivable that part of the pipe is in the open air. It can also be surrounded by something other than earth. For example, it can be inside a structure, of concrete or otherwise.

The system shown in FIG. 1 comprises a self-contained module 1, to which a mechanical link 2 is connected.

FIG. 2 shows an example of a self-contained module 1 and various elements which it is likely to incorporate.

In this example, the self-contained module 1 includes means of acquiring acoustic data, which for example can take the form of a microphone 10. In this case, the microphone 10 is advantageously set to the frequency/frequencies representing a leak of fluid 28 in the pipe 4, to simplify the analysis of the acquired acoustic data.

More generally, the self-contained module 1 includes means of acquiring data, subsequent analysis of which makes it possible to obtain information relating to the pipe 4. For example, in addition to or replacing the means of acquiring acoustic data, the self-contained module 1 could incorporate means of acquiring visual data, such as a camera or miniature camera.

The data acquisition means can, for example, be arranged to make it possible to detect a leak in the pipe 4. As a variant or in addition, they can be arranged to obtain characteristics of the pipe 4 such as diameter, ovality, internal fouling, internal furring, discontinuity of the internal surface of the pipe, coherence of surrounding ground, profile in plan and/or elevation, the presence of a magnetic element, internal pressure, speed of fluid flow, etc.

The self-contained module 1 also includes means of storing the data which the data acquisition means acquire. These storing means can take the form of a memory 11, which can be of any conceivable type. This memory can include, for example, a miniature removable medium such as a micro/mini-SD ("Secure Digital") card or other.

The self-sufficiency of the self-contained module 1 thus results from the ability of this module to record and store data, subsequent analysis of which may make it possible to obtain information about the pipe 4. It also results from the ability of the self-contained module 1 to function without needing to be supplied with energy from outside.

For this purpose, a power supply 12 can be incorporated into the self-contained module 1, to supply it with the energy which it needs to function for a chosen period of time.

This power supply can, for example, comprise a rechargeable battery. In this case, the battery is advantageously rechargeable from outside the self-contained module 1, to avoid having to open this module to carry out the recharging operation. As a variant, it is possible to change the battery of the self-contained module 1, if this proves to be necessary.

It is also possible to include in the module a device for recharging the battery, based on a hydraulic micro generator and taking advantage of the relative speed difference between the flow and the self-contained module.

Advantageously, the self-contained module can include a check on the charge of the battery, and can request, by emitting a specific sound, that the pushing is stopped, so that when it is stopped, the recharging energy which depends on this speed differential is increased and reduces the charging time.

In all cases, the power supply 12 advantageously makes it possible to supply energy to all the elements which require it within the self-contained module 1.

As an option, the self-contained module 1 can also include means of generating a signal, such as a noise, which is suitable for being captured from outside the pipe 4 by an appropriate means, when the module is inside the pipe 4. These means can, for example, take the form of an emitter of a characteristic sound, such as a beeper 14.

Also as an option, the self-contained module 1 can incorporate an internal clock 13. This clock is advantageously synchronised with an external clock, as will be detailed below.

To obtain information about the pipe 4 of FIG. 1, for example to detect a leak or obtain other characteristics of the pipe, the self-contained module 1 is introduced into this pipe via an access point 8.

Before this introduction, the mechanical link 2 is linked to the self-contained module 1. This connection between the mechanical link 2 and the self-contained module 1 can be direct or via one or more elements.

In the example shown in FIG. 1, a swivel 3 is arranged between the mechanical link 2 and the self-contained module 1, in such a way as to allow free rotation of the self-contained module 1, even when the mechanical link 2 remains fixed.

The self-contained module 1 is also arranged to be pushed by the fluid flow 28 transported by the pipe 4. The shape, dimensions, or any other relevant characteristic parameter of the self-contained module 1 can be chosen for this purpose. Thus it may be possible to avoid the use of devices for improving the movement of the self-contained module 1 in the fluid 28, of the type of an open parachute at the head of the module or other.

As an example, an appreciably elongated shape of the self-contained module 1, as shown in FIG. 1, or any other shape having hydrodynamic properties which make easy circulation of the self-contained module 1 in the pipe 4 possible can be adopted.

It is also possible to divide the module into multiple sub-modules, in such a way as to form a train of modules. This configuration makes it possible to limit the total length of the equivalent module, and makes it easy to go round obstacles and through bends. If necessary, a communication and energy link can be provided between the various sub-modules. This communication link can include, for example, one or more copper wires, optical fibre or other. In this arrangement, one of the elements of the train of modules can be dedicated to powering the other sub-modules for example, making it possible to adapt the self-sufficiency of the whole.

The dimensions of the self-contained module 1 are advantageously chosen not to reach or exceed the smallest cross-section of the pipe 4, to avoid the self-contained module 1 being jammed there.

It is also possible to envisage designing the self-contained module 1 in such a way that its density is of the same order as that of the fluid 28, with the object of ensuring that the self-contained module 1 floats at about mid-height of the pipe 4. Other steps can also be taken to ensure adequate floating of the self-contained module 1.

According to an advantageous configuration, the self-contained module 1 includes a shell which is impermeable to the fluid 28, e.g. metallic, and protects the various elements which are incorporated in this module, and an upper layer surrounding the impermeable shell, and consisting, for example, of a material which ensures the desired floating properties, such as a foam with closed cells or other.

Of course, other types of self-contained module 1 are also conceivable.

In the same way as for the self-contained module 1, the density of the mechanical link 2 can be chosen near that of the fluid, in such a way that it positions itself naturally just below the surface, and does not come to rest at the bottom of the pipe 4. The link is purely mechanical, and this possibility (of low density) can be made possible by the fact that its diameter is determined only by the necessary mechanical resistance to traction for its return. A low density can also be obtained by juxtaposition, for example by coextrusion, of a material of very low density and low mechanical resistance with a material of high mechanical resistance and greater density. However, this characteristic is not necessary to the advance of the mechanical link 2 into the pipe 4; it could simply make it easier.

FIG. 8 shows a variant of self-contained module consisting of an assembly of elements, each ensuring respective functions. This assembly can be a juxtaposition of stages or specialised sections, for example.

When, as was mentioned above, the self-contained module is divided into sub-modules which are linked, but not adjacent, to each other, the sub-modules in question can each include one or more of said stages or specialised sections.

In the example shown in FIG. 8, the various stages comprise an engagement and stress measurement stage 31, a steering stage 32, two situation stages 33 and 38, a ballasting stage 34, a battery and balancing stage 35, a memory, calculation and clock stage 36, a stage 37 for acquisition, transmission and/or reception of signals, e.g. acoustic or other, and a stage 39 for pressure measurement, speed measurement, inertial unit and/or magnetometer.

In addition or as a variant, the self-contained module can include a stage for generation of a shock wave in the direction of the wall of the pipe, and for recovery of the returning vibration wave, and/or a stage comprising one or more flexible rods which are bent when they rest on the internal wall of the pipe, to follow and analyse its surface.

A bus 29, e.g. of wire, advantageously makes communication and power supply to the different stages possible. In the case that the self-contained module consists of a train of modules, as mentioned above, this bus can become an external link.

The stages can be fixed two by two, e.g. by screwing.

Leakproofness between these stages can be ensured using O-rings, for example. In the case of the ballasting stage 34, draining/filling holes are arranged there, and general leakproofness can be made by a second envelope, for example.

The functions of the different stages of the self-contained module 30, to the extent that they differ from those of the elements of the self-contained module 1, will be detailed below.

After introduction of the self-contained module 1 (or 30) into the pipe 4, this module is pushed by the fluid flow 28, because of its properties and the speed of movement of the fluid 28 inside the pipe 4.

In the course of its progress inside the pipe 4, the self-contained module 1 (or 30) drags the mechanical link 2, to which it is connected.

It should be noted that this mechanical link 2 can of course also be dragged directly by the fluid flow 28, in the direction of this flow. This results from the friction between the mechanical link 2 and the fluid 28. A section of fluid drags a section of mechanical link with it.

By the effect of the friction of the fluid 28, the mechanical link 2 could even overtake the self-contained module 1 (or 30) for moments, in particular when the speed of the self-contained module 1 becomes less than the speed of the fluid flow 28, which would also be that of the mechanical link 2. The latter can then form a loop.

The mechanical link 2 can initially be wound on a reel 5. In this case, the mechanical link 2 is delivered from the reel 5, as the self-contained module 1 (or 30) progresses inside the pipe 4.

Thus the self-contained module 1 (or 30) can travel a length equal or near to that of the mechanical link 2, inside the pipe 4. In fact, when the whole of the mechanical link 2 has been delivered from the reel 5 to which one end of the mechanical link 2 is fixed, the mechanical link 2 holds the self-contained module 1 (or 30) back and prevents it from continuing its progress in the pipe 4.

To introduce the self-contained module 1 (or 30) into the pipe 4 under pressure, an insertion device 7 can advantageously be used. This device can, for example, be based on the principle of pushers, for example of rollers and/or caterpillar tracks, such as can be found for threading cables for prestressing or guy line winches.

An insertion device of the same type (which may be the same device) or a different type can be used to push the mechanical link 2 into the pipe 4 under pressure, as the self-contained module 1 (or 30) progresses inside this pipe.

In the absence of any friction between the mechanical link 2 and the pipe 4 on the one hand, and at the introduction of the mechanical link 2 into the pipe 4 on the other hand, it would not be useful to exert an external force on the mechanical link 2 so that it circulates in the fluid flow 28 in the direction of this flow. This link could even be necessary so that it does not overtake the self-contained module 1, and remains stretched at all points.

However, these conditions are in general not fulfilled, on the one hand because the pipe 4 is not necessarily linear on the whole excursion of the self-contained module 1, and the mechanical link 2 will rub at least at the bends of the pipe 4, and on the other hand because the introduction of the mechanical link 2 into the pipe 4 under pressure implies leakproofing at this location and resistant friction. Pushing the mechanical link 2 into the pipe 4 under pressure can then make it possible to overcome this friction.

However, it remains true that in the regions where the mechanical link 2 is not held back by friction, the friction of the fluid flow 28 can still drag it in the direction of the flow. Downstream from the friction of the mechanical link 2 against the pipe 4 or at introduction, the friction of the fluid 28 against the mechanical link 2 corresponds to traction; upstream, to a form of pushing. Thus on one side and the other of friction against the pipe 4, joint forces are exerted to oppose it.

The insertion device which is used to introduce the mechanical link 2 into the pipe 4 advantageously makes it possible to overcome the leakproofing friction, which is typically achieved by one or more O-rings, one or more lip seals or a cable gland system. It can also make it possible to push the mechanical link 2 into the pipe 4, in such a way as to accompany its dragging by the fluid flow 28 in the direction of flow. Functioning in reverse, the insertion device becomes the extraction device, and it then advantageously makes it possible to overcome the stresses resulting from the friction of the mechanical link 2 in the fluid flow 28 and against the pipe 4, and those resulting from the leakproofing friction.

In the case of the outgoing excursion of the self-contained module 1 in the pipe 4, the constant pushing of the mechanical link 2 into the pipe 4 can make it possible to overcome the stresses resulting from the friction of the mechanical link 2 against the pipe 4, in several ways.

As indicated above, the fluid flow 28 drags the mechanical link 2 with it, and the fact that it is introduced continuously does not counteract this fact.

In the case of friction of the mechanical link 2 against the pipe 4, introduction of the mechanical link 2 generates a compression force which is transmitted along the mechanical link 2, and which, being added as necessary to the upstream and downstream forces resulting from the friction of the fluid 28 against the mechanical link 2, can be of such a kind as to make it possible to overcome this result of the friction of the mechanical link 2 against the pipe 4.

Figure 14A:
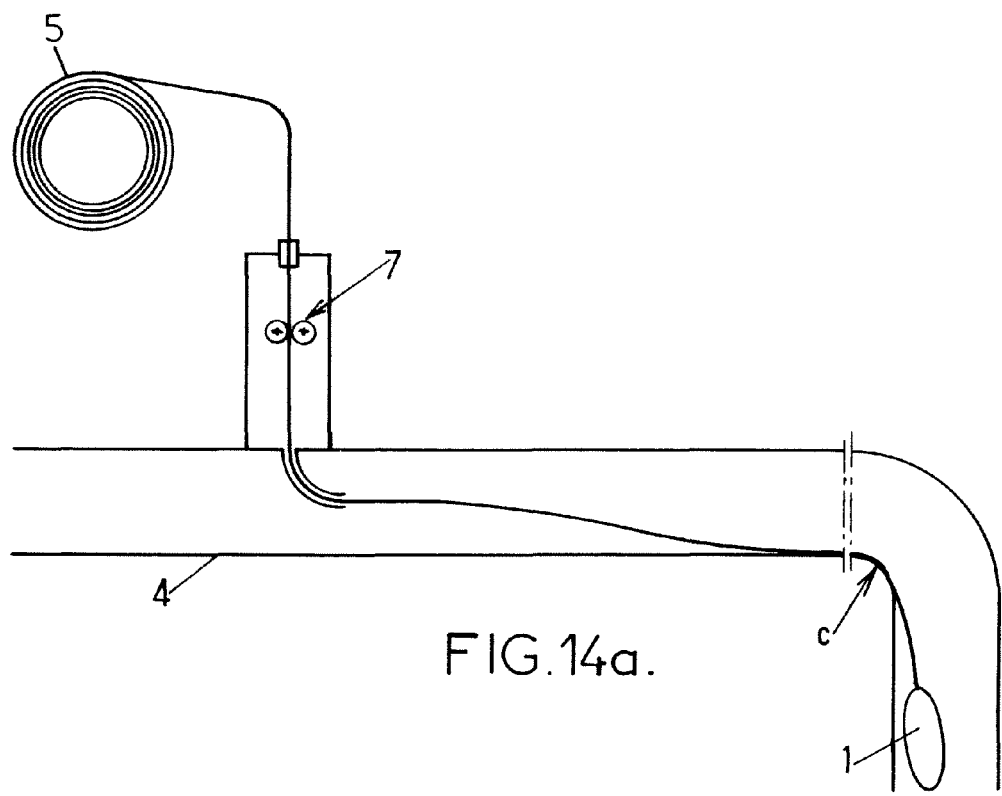
FIGS. 14a-14c are diagrams showing, at successive instants, phenomena which can occur when a mechanical link is introduced into a pipe by pushing.
Figure 14B:
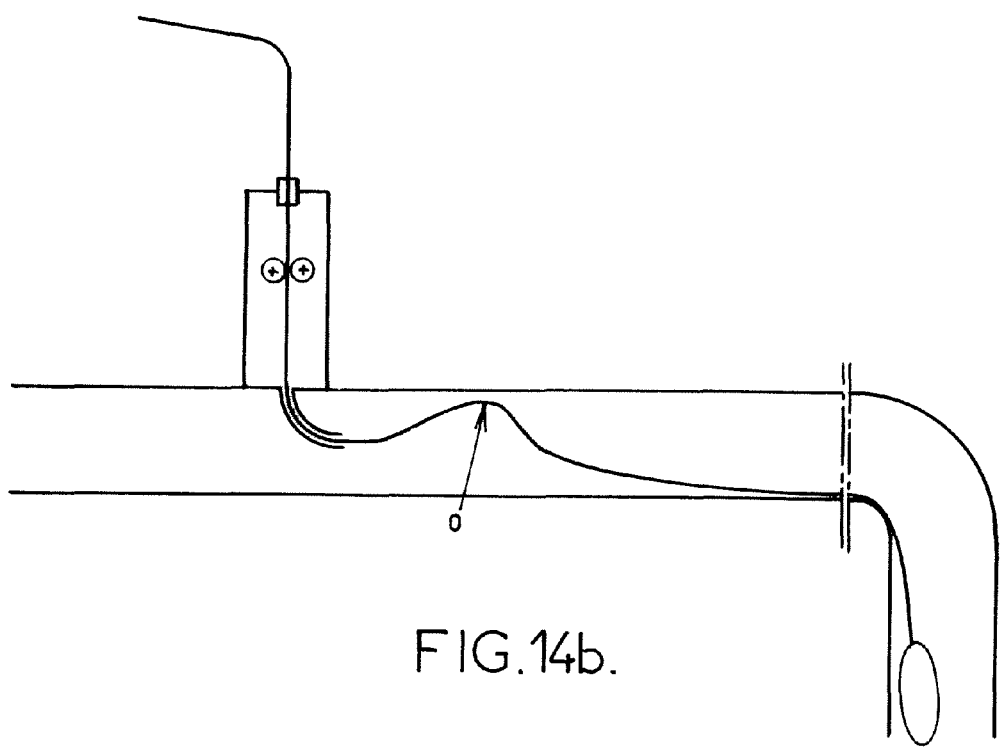
Figure 14C:
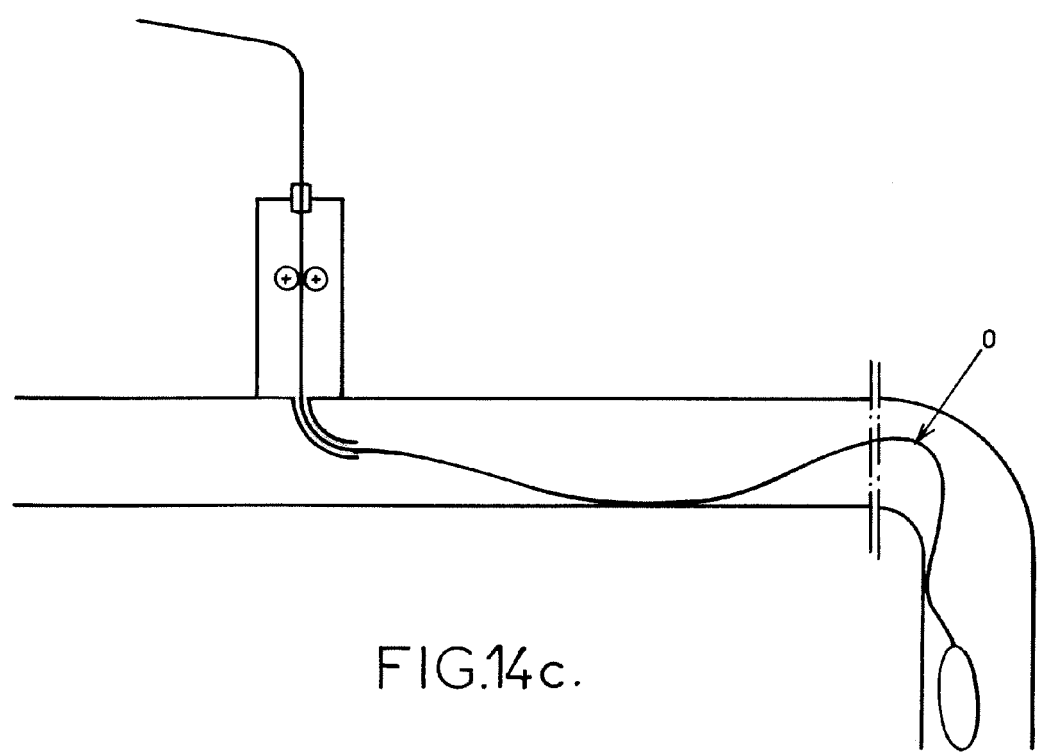

However, as shown in FIGS. 14a to 14c, taking account of the ratio of length between friction to diameter of the mechanical link 2, it is probable that the pushing which generates this compression force, if the friction of the mechanical link 2 against the pipe 4 is large, can cause a form of elastic instability, buckling, between the pushing point 7 and this wedging c. However, this phenomenon can be such as to unjam the mechanical link 2 on the level with the wedging c by a whiplash effect resulting from propagation in the direction of the fluid flow 28 of the wave of instability o of the mechanical link 2 on the one hand, and also by the fact that at the time of the instability, the mechanical link 2 will present to the fluid 28 a greater surface than if it remains parallel to the flow, and will thus cause a greater thrust. Once this friction point is passed, the wave of the mechanical link 2 can be propagated along it, and can unjam a subsequent friction in the same way.

This would not happen if the link was simply pulled by the module. This explains the advantage of continuously pushing the mechanical link 2 into the pipe 4.

Figure 15A:
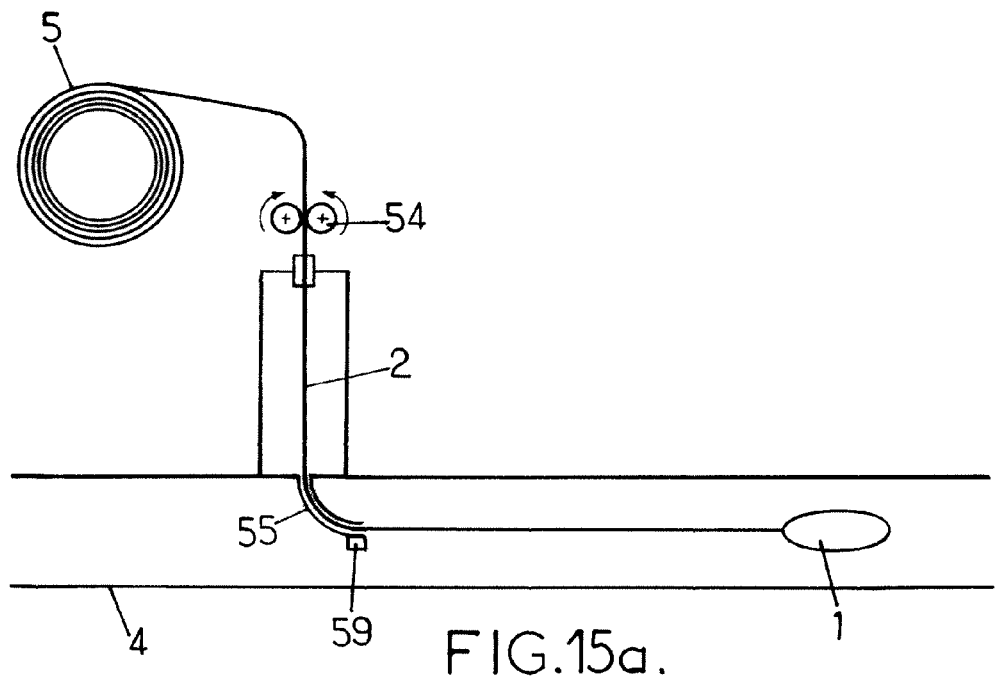
FIGS. 15a-15c are diagrams showing examples of systems for pushing and/or pulling a mechanical link in a pipe.
Figure 15B:
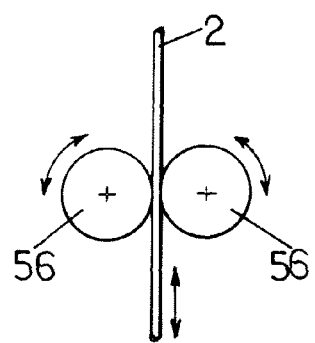

As shown in FIG. 15a, the pushing, and then, on return, the pulling can for example be achieved by a system 54, which is moved by an electric or hydraulic motor. For example, this system can have rollers 56 (FIG. 15b) or belts 57 which move around pulleys 58. At the entry into the pipe 4, the mechanical link 2 can advantageously be guided by an appropriate guidance means 55.

Advantageously, a device 59 for measuring the speed of flow of the fluid 28 can for example be arranged at the point where the mechanical link 2 is carried by the fluid flow 28. In this way, the system 54 may adapt the speed of introduction of the mechanical link 2 into the pipe 4 as a function of such a measurement of the speed of flow of the fluid 28, e.g. by regulating it to approximately the same value as this measurement.

A means of measuring the stress of introducing/extracting the mechanical link 2 into/out of the pipe 4 can also be used. This stress represents the friction due to leakproofing of the introduction of the mechanical link 2, both outgoing and returning, the stress of pushing/pulling the mechanical link 2 into/out of the pipe 4, but also the necessary stress to unwind the reserve of link outside the pipe 4 and the internal losses of the system.

The measurement of the stress can result from a simple calculation of the electrical consumption, for example if the system 54 is moved by one or more electric motors, or from measurement of the pressure and flow rate in the case of one or more hydraulic motors, the speed of introduction of the mechanical link 2 into the pipe being measured elsewhere.

Figure 16:
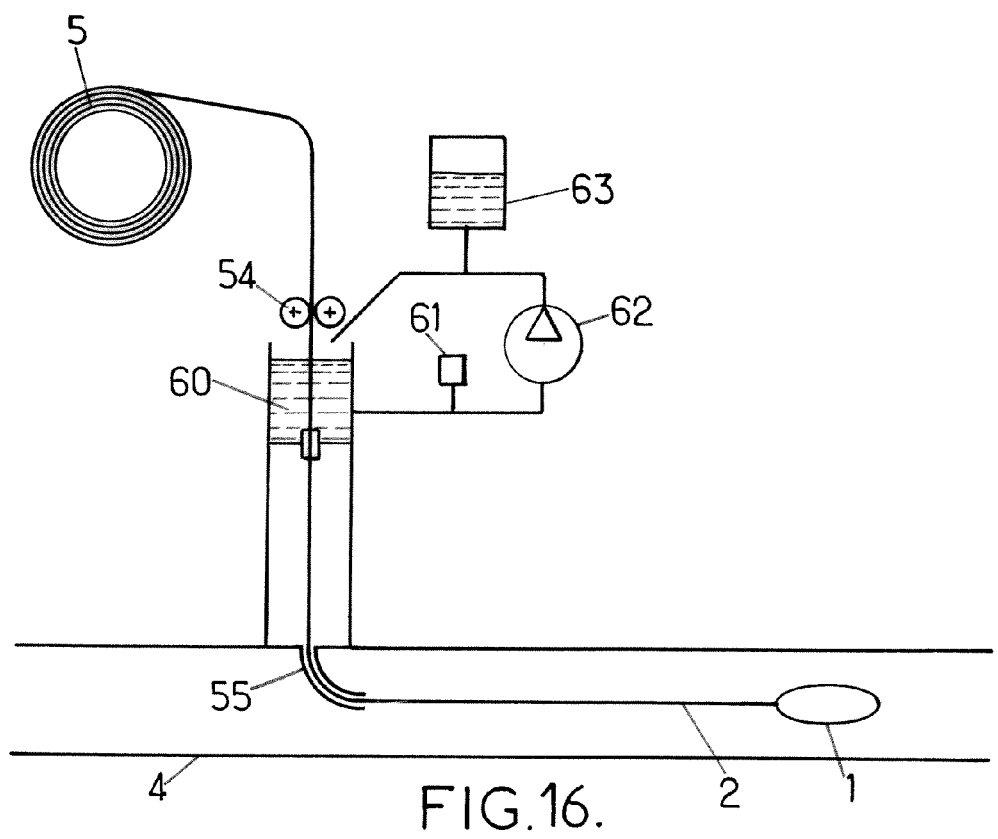
FIG. 16 is a diagram showing an example of a system which carries out a disinfection of a mechanical link before it is inserted into a pipe.

Also, as shown in FIG. 16, in the case that the pipe 4 is, for example, a pipe for drinking water, the insertion device of the mechanical link 2 can include a region 60 for continuous disinfection of the link of the mechanical link 2 before it is introduced into the pipe 4. The dosage of disinfectant contained in the region 60 can be controlled using an appropriate circuit, containing for example a reserve 63 of disinfectant, a pump 62 and a device 61 for checking the dosage in the region 60.

Figure 17:
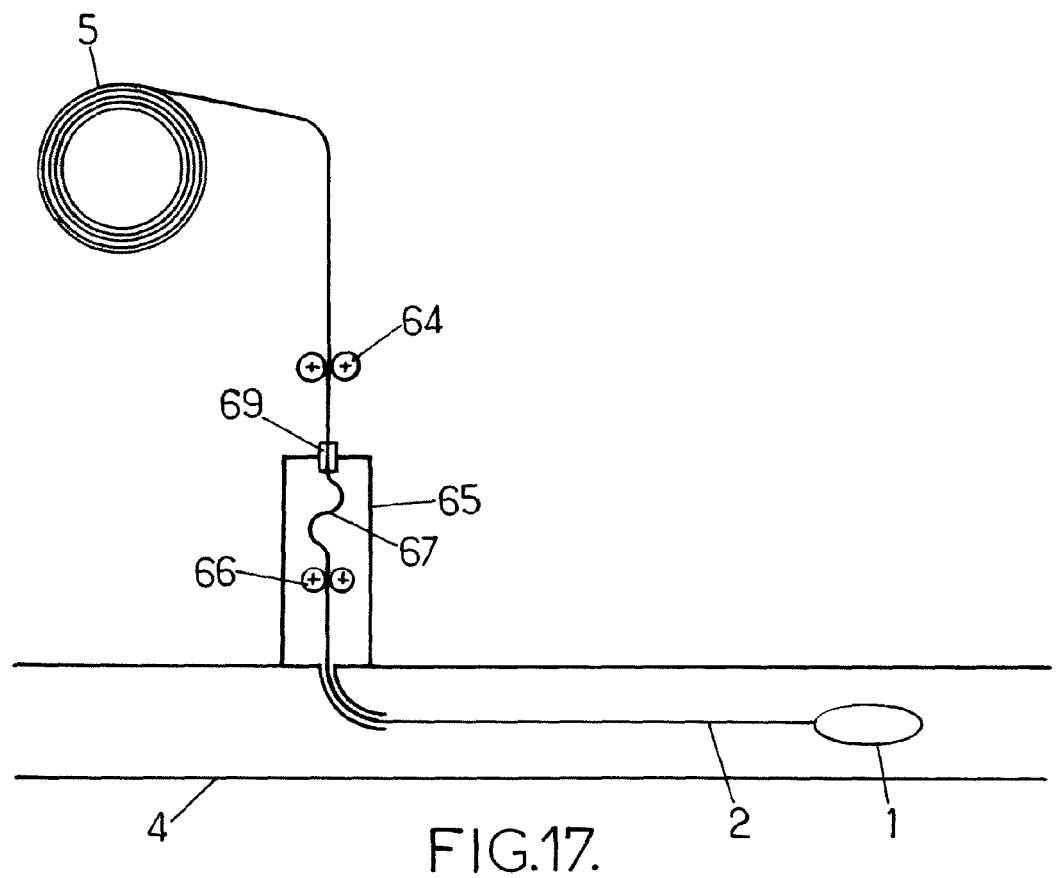
FIG. 17 is a diagram showing an example of a system of two stages for introducing a mechanical link into a pipe.

According to another optional refinement shown in FIG. 17, the pushing of the mechanical link 2 into the pipe 4 and the introduction of the mechanical link 2 into the pushing region 65, hereafter called the lock chamber, are dissociated. The mechanical link 2 is then pushed into the pipe 4 by pushing means 66 in the lock chamber 65. On the other hand, the means of introducing 64 the mechanical link 2 into the lock chamber 65 are upstream from the lock chamber, leakproofness means 69 being advantageously arranged at the entry to the lock chamber 65.

Thus the necessary stress to introduce or extract the mechanical link 2 relative to the pipe 4 is distinguished from the necessary stress to introduce or extract the mechanical link 2 relative to the lock chamber 65. In this case, measurement of the stress to introduce/extract the mechanical link 2 relative to the pipe 4 can give additional information, which can be exploited to know the configuration characteristics of the pipe 4.

It is also possible to leave a slack part 67 of the mechanical link 2 between the two systems 64 and 66 for introduction and extraction respectively, to avoid a pulling stress on the pushing system.

Figure 18:
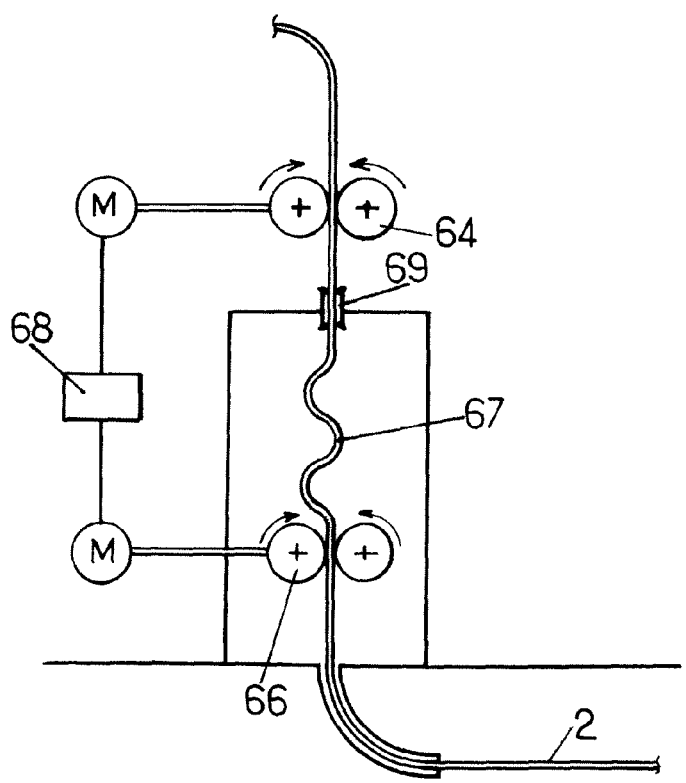
FIG. 18 is a diagram showing an example of a system comprising a servo system between two distinct stages.

Synchronisation of the speeds of advance of the mechanical link 2 on each of the two systems is advantageously achieved by servo control 68 of the system 64 for introducing the mechanical link 2 by the system 66 for pushing in the pipe 4, in such a way that the length of introduced mechanical link 2 corresponds to that of pushed mechanical link 2. Such a servo system is shown in FIG. 18. The introduction system 64 can also be dimensioned to make it possible to unwind the reserve of mechanical link 2, if it is on a cable drum for example.

In this case, measurement of the stress of pushing the mechanical link 2 into the pipe 4 can give information about possible wedging and elastic instability as described above: in the first case a discontinuous increase of the pushing stress, in the second case a sharp reduction.

In this case, measurement of the pulling stress outside the pipe 4 can make it possible, by comparison with the stress measured at the same moment on the swivel 3 of the self-contained module 1, to calculate frictions and deviations of the mechanical link 2 in the pipe 4. This comparison is made possible by synchronisation of the clocks. The pulling stress results from the sum of the necessary stresses to pull the mechanical link 2 in the fluid flow 28 in the opposite direction to the flow, these stresses resulting from the friction of the mechanical link 2 in the fluid 28, friction stresses to be overcome between the pipe 4 and the mechanical link 2 where it is in contact, stresses from its sticking in the bends and the total stress of the self-contained module 1.

Another exploitation of measurement of the concomitant pulling and received stresses on the self-contained module 1 makes it possible to calculate, at the end of extraction, the lengthening of the mechanical link 2 between each of the friction points forming as many sections of link, and thus to correct the length of the introduced or extracted mechanical link 2, measured by the measurement system relative to the lengthening of the mechanical link 2 between these sections. This correction is such as to improve significantly the curvilinear location of the self-contained module 1 as a function of time. The length of the mechanical link 2, in the return phase in particular, can be considered as the unwound length, to which it is right to add the sum of the absolute lengthenings resulting from the application of tensile stress to the mechanical link 2 in the sections.

The self-sufficiency of the self-contained module 1 (or 30), in terms of both data storing and power supply, enables it to achieve, by itself, most or all of the operations which will allow subsequent analysis of the acquired data, leading to obtaining information about the pipe 4.

In particular, it is because of this self-sufficiency of the self-contained module 1 (or 30) that the system according to the invention is enabled to use only a simple mechanical link to connect the self-contained module 1 (or 30) to outside the pipe 4.

Such a mechanical link must be understood as a link having no properties which enable it to transmit data which the self-contained module 1 (or 30) acquires to outside the pipe 4, or to supply energy to the self-contained module 1 (or 30) from outside the pipe 4. This constitutes an important difference from the Sahara solution described in the introduction.

Such a mechanical link can have a useful section which is much less than the cable which Sahara uses. Consequently, the length of the mechanical link 2 which can be used without interfering with the progress of the self-contained module 1 (or 30) inside the pipe 4 can be much greater than that of the Sahara cable.

As an example, a mechanical link of a length of the order of approximately ten kilometres, e.g. around 20 km, can be used.

This is a considerable advantage, since data acquisition making it possible to obtain information over such a distance can be done once, whereas it would have required ten successive acquisitions on the respective sub-portions of the pipe with the solution of the prior art.

This also makes it possible to obtain information even when the access points to the pipe under consideration are very distant from each other, typically of the order of approximately ten kilometres.

The mechanical link 2 can, for example, be a steel, glass fibre or carbon fibre cable.

In this case, a cable diameter of the order of a millimetre, e.g. between 3 and 4 millimetres, could be enough. The small useful section of the mechanical link 2 enables the reel 5 on which this mechanical link may be wound to have a relatively small weight, which makes it easier to transport.

Of course, other materials can also be envisaged and adapted, depending on the type of pipe and fluid under consideration.

Advantageously, the mechanical link 2 could include a protective sheath around a cable.

The mechanical link 2 could also be a cable of which the pitch of the stranding is the reverse of the pitch of the cabling, to balance the moments.

A minimum or controlled coefficient of elongation of the mechanical link 2 could also be used.

Advantageously, the nature of the mechanical link 2 will be chosen to limit the friction forces with the fluid 28 and the inside of the pipe 4 at the time of any contacts between them, in particular in regions of curvature of the pipe.

For this purpose, the mechanical link 2 can be embedded in a material with a low coefficient of friction against the pipe 4, so that the stresses resulting from this friction are easily overcome by the sum of the stresses resulting from the friction of the fluid 28 against the mechanical link 2. The mechanical link 2 itself can consist of a homogeneous material with this low coefficient of friction, while having the necessary mechanical resistance to traction for its return. This embedding would also have the advantage of making the periphery of the mechanical link 2 round and smooth, which is not the case of a cable consisting of stranded wires for example, and thus making leakproofing of the introduction simpler.

Information about the pipe 4 can be obtained in the following way.

After introduction of the self-contained module 1 (or 30) into the pipe 4, this self-contained module 1, followed by the mechanical link 2, is pushed by the fluid flow 28. In the course of its progress inside the pipe 4, the self-contained module 1 (or 30) acquires and stores relevant data.

The position of the self-contained module 1 (or 30) inside the pipe 4 can be known by measuring the length of the mechanical link 2 which is introduced into the pipe 4 as the self-contained module 1 (or 30) is pushed by the fluid flow 28.

For this purpose, automatic measurement means 6 can be arranged, for example, near the access point 8. As a variant, the measurement means could be placed near the reel 5, to evaluate the length of the mechanical link 2 which is delivered from this reel. In the latter case, the length of the mechanical link 2 which is introduced into the pipe 4 can be deduced from the measured length of the mechanical link 2 which is delivered from the reel 5, the distance between the reel 5 and the access point 8 being known. The measurement means could also be part of a system for pushing and/or pulling the mechanical link 2, as described above.

Thus the length of mechanical link 2 pushed into the pipe can be permanently known. This measurement can be time-stamped by a clock which is perfectly synchronised with an on-board clock in the self-contained module 1. This synchronisation then makes it possible to know the length of mechanical link 2 introduced into the pipe 4 at the moment of an event which the self-contained module 1 stores. This knowledge can provide information about the curvilinear location of this event.

Figure 15C:
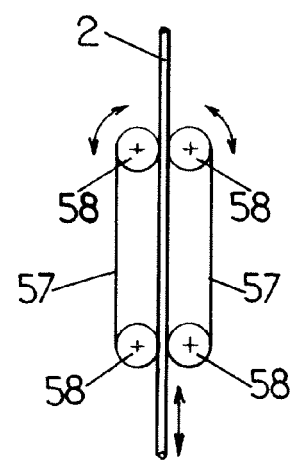

When a pushing system as described above with reference to FIGS. 15*a*-15*c* is used, the length of mechanical link 2 introduced into the pipe 4 can be measured, for example, by measuring the number of turns of the introduction rollers 56, or by the number of turns of the driving pulleys 58 of the belts 57, and then taking account of the length of the belts.

To avoid any drift due to a driving coefficient of the mechanical link 2 between the rollers 56 or belts 57, these can have shapes which make it possible to clamp the mechanical link 2 sufficiently to avoid slippage. Thus the part of the rollers or belts in contact with the mechanical link 2 could have notches. Similarly, the inside of the belts 57 could be notched to avoid any slippage between the pulleys 58 and belts 57.

The geographical position of the self-contained module 1 (or 30) can also be determined, or adjusted in addition to the analysis of the length of the mechanical link 2 introduced into the pipe 4, by monitoring a signal, an acoustic signal for example, which is generated by the element 14 of the self-contained module 1 (or the transmission means of the stage 37 of the self-contained module 30). The signal is captured using appropriate means, which an operator at the surface has, along the pipe 4.

Advantageously, an external clock outside the pipe 4 can be used as a time reference for monitoring the introduction of the mechanical link 2 into the pipe 4.

This clock can advantageously be coupled to the measurement means 6, in such a way that it is possible to know the length of the mechanical link 2 introduced into the pipe 4 at every instant in the course of the progress of the self-contained module 1 (or 30) inside this pipe. This makes it possible to obtain an indication of the geographical position of the self-contained module 1 (or 30) inside the pipe 4, as a function of the time measured by the external clock. A coding wheel can be used for this purpose.

The internal clock 13 of the self-contained module 1 (or of the stage 36 of the self-contained module 30), if it exists, is advantageously synchronised with this external clock. This makes it possible to have a single time reference.

Advantageously, the engagement stress between the self-contained module and the mechanical link can be measured, and conclusions can be drawn from this measurement.

Figure 10:
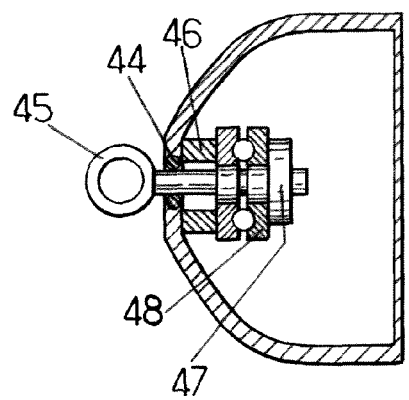
FIG. 10 is a diagram showing the detail of a stage of the self-contained module according to FIG. 8.

For this purpose, the stage 31 of the self-contained module 30, which is enlarged in FIG. 10, can include a swivel 45 to connect the mechanical link 2 to the self-contained module, a coupling 44, a sensor to measure the tensile stress 46, a thrust ball bearing 48 and an arrester 47.

The sensor 46 (which could also be positioned differently, e.g. at the interface between the swivel 45 and the mechanical link 2) supplies an indicative measurement of the traction exerted between the self-contained module 30 and the mechanical link 2.

This measurement can be analysed, e.g. by comparison with a threshold which could be predetermined or indicated as an instruction which may vary. If the measured tensile stress is low, this means that the speed of the mechanical link 2 and that of the self-contained module 30 are close, either because the two are advancing at the same rate, or because the self-contained module 30 is jammed.

If the measured tensile stress is large, this means that the self-contained module 30 is advancing much faster than the mechanical link 2 unwinds in the outgoing direction, or that the speed of rewinding of the mechanical link 2 is too fast in the return direction. In the first case, the mechanical link 2 should be pushed faster into the pipe 4. In the second case, the mechanical link 2 should be pulled more slowly out of the pipe 4.

If the analysis of the tensile stress measurement is entirely achieved by the self-contained module 30, the latter can advantageously transmit a signal which is capable of being propagated in the fluid 28, for example as far as the access point 8, to communicate the information about this measurement to it. For example, if the tensile stress measurement exceeds a threshold, a signal can be transmitted to indicate that this stress ought to be reduced. The signal can be transmitted by the stage 37, the method of operation of which will be described in detail below.

In one of its arrangements, the self-contained module can contain probes to measure the characteristics of the fluid which the pipe carries, e.g. in the case of drinking water, a means of measuring chlorine concentration, pH, temperature and/or any other parameter which is involved in defining the quality of the fluid.

Advantageously, the position of the self-contained module relative to the internal walls of the pipe can be measured.

For this purpose, the self-contained module should preferably have a position at constant height in the pipe and have a constant list, i.e. its centre of gravity should be below its centre of buoyancy, so that it cannot, or only with great difficulty, incline around a vertical axis. This can easily be obtained by an appropriate distribution of masses and volumes.

The position of the self-contained module 30 can be measured using on-board sensors 50 on this module, e.g. around the situation stages 33 and 38. Each of these sensors measures the distance r11, r12, r13 or r14 which separates it from the internal wall of the pipe 4, as is shown in FIGS. 11a and 11b, in side view and sectional view respectively.

These sensors 50 are, for example, sonars which emit and receive an ultrasound vibration which is reflected on the wall. Measuring the time of a two-way trajectory of this vibration gives information on the distance between the sonar and the wall facing it. Even if the speed of sound is affected by the speed and pressure of the fluid, it can be considered that the measurement of each sensor is affected in the same way. Measurements of relative time can therefore be used to know the up-down and left-right positions of the self-contained module 30 in the pipe 4.

Figure 11A:
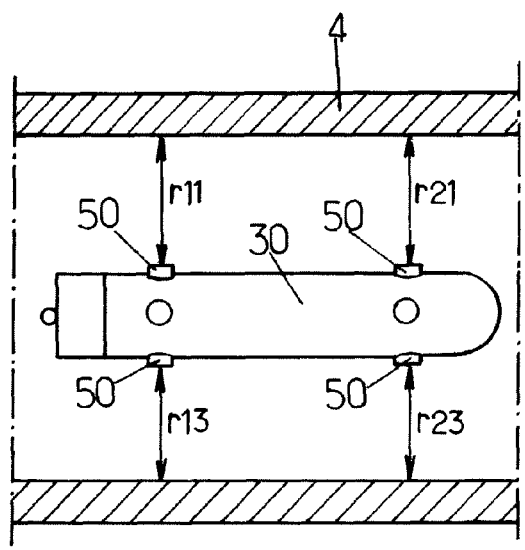
FIGS. 11a-11b are diagrams showing, in side view and sectional view respectively, a self-contained module which is equipped with sensors to take position measurements.
Figure 11B:
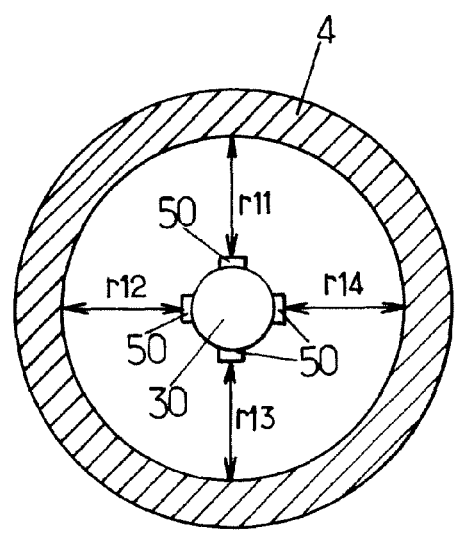

The arrangement of two by four sensors shown in FIGS. 11a and 11b can also give information about the relative inclination of the self-contained module 30 in the pipe 4.

Like the other measurements which the self-contained module takes, these position measurements can be stored locally if appropriate.

By means of a measurement of the speed of sound in the fluid 28 in local conditions (pressure, temperature and speed of fluid), these position measurements can also be exploited to characterise the internal geometry of the pipe: diameter, ovality, fouling, furring, etc.

The above-mentioned speed of sound in the fluid 28 can be obtained by installing on the self-contained module 30 a sensor 42 pointing to a fixed geometrical feature 41, the distance of which from the sensor 42 is known and invariable, so that the speed can be calculated directly from the time measurement. This speed can then be used to calculate the distances.

As a variant, the speed of sound in the fluid 28 can be obtained by using two ultrasound emitters-receivers, on the model of static ultrasound anemometers, instead of the above-mentioned elements 41 and 42, et comparing the time in one direction and the other. The difference resulting from this comparison is representative of the speed of the self-contained module 30 relative to the fluid 28. In particular, if the self-contained module is at an absolute standstill, the time difference is directly representative of the speed of the fluid.

The information which is obtained about the internal geometry of the pipe is advantageously stored and time-stamped, e.g. in the stage 36 of the self-contained module 30. Subsequently, this information can thus be situated on a curvilinear abscissa along the pipe 4. This possibility of reconstituting the internal geometry of the pipe can be extremely useful to the manager of this pipe.

In an advantageous arrangement, shown in FIGS. 19 and 20, the self-contained module 30 (or 1) includes, on its periphery, an element which carries one or more flexible rods 70 which are sufficiently long to touch the internal wall of the pipe 4 and be bent, but sufficiently flexible to not oppose significantly the advance of the self-contained module in the pipe, and then its return. Contact with the wall of the pipe makes the rods 70 bend, and consequently the difference of distance between the self-contained module and the wall of the pipe modifies the bending of the rods.

As they advance in the pipe 4, these rods 70 are in contact with the internal wall of the pipe, and measurement of their respective and/or relative bending, e.g. in response to a change of section of the pipe or a variation due to roughness of the internal wall of the pipe, can make it possible to recover the internal profile of the pipe.

FIG. 21 shows an example of variation of the bending of the flexible rods $70_1$ and $70_2$ of the self-contained module 30 (or 1), on passing a joint 71 of the pipe 4. As indicated by the curve of FIG. 21, the bending F of the two rods diminishes sharply at the joint, and then returns to its initial value.

In the same way, FIG. 22 shows an example of variation of the bending of the flexible rods $70_1$ and $70_2$ of the self-contained module 30 (or 1), on passing a dislocation 72, with a change of angle, of the pipe 4. As indicated by the curves of FIG. 22, the bendings F1 and F2, corresponding respectively to the flexible rods $70_1$ and $70_2$, each diminish on passing the dislocation 72, then increase beyond this dislocation, but over periods which may be different.

The flexible rods which are used can, for example, consist of glass fibre. A light can be emitted there, and the intensity on return can be measured relative to the emitted intensity. The attenuation of the intensity is actually a function of the curvature of the fibre.

As a variant or in addition, the flexible rods can, for example, consist of a thin strip of an elastic material such as steel or a plastic material with low deformation, on both sides of which elements which are sensitive to deformation such as deformation gauges or optical sensors based on Bragg network technology are stuck, screen printed, welded or associated by any other technique of plane, close bonding.

In such an arrangement, bending a rod will cause, equally and oppositely, deformation of the rod (traction on one face, compression on the opposite face) strictly in proportion to the bending.

Movement of the self-contained module is also possible. For example, the steering stage 32 and ballasting stage 34 of the self-contained module 30 can fulfil this role.

Figure 12:
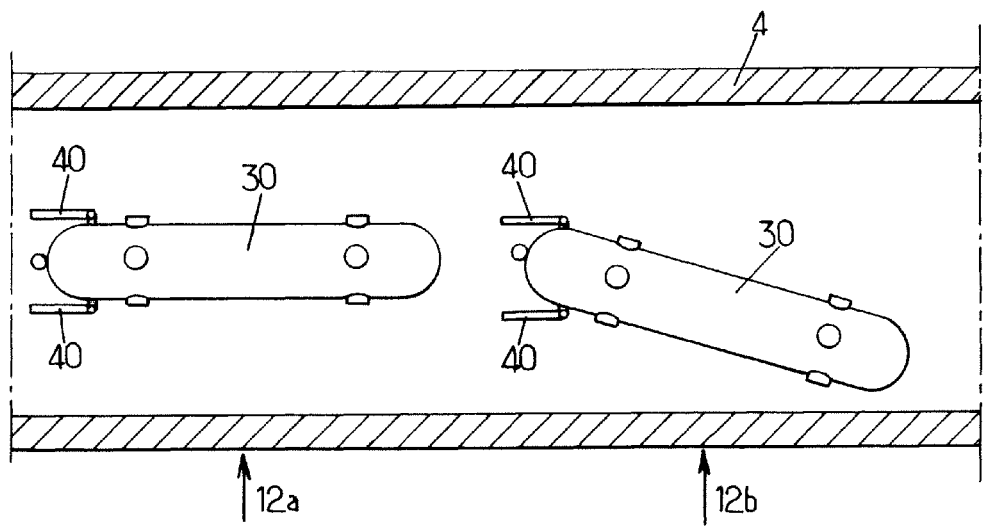
FIG. 12 is a diagram showing, in plan view, a self-contained module which is equipped with rudders so that it can move sideways.

One or more rudders (or fins) 40 can thus make left-right movement of the self-contained module 30 possible, as in the case of a ship. This is shown in FIG. 12, which is a plan view, where the self-contained module 30 first moves in the axis of the pipe 4 (configuration 12a, the fluid moving from left to right in this figure), then moves towards a wall of the pipe 4 following pivoting of the rudders 40 relative to the longitudinal axis of the self-contained module 30 (configuration 12b).

The ballasting can be made possible, for example, by compression/decompression of a volume of air enclosed in a leakproof bladder or a volume of elastic foam with closed cells and compressed by a device with a micro-motor, of piston pot or micro-screw type. The volume of compressed air being replaced by an equivalent volume of water, the density of the self-contained module increases and it descends in the pipe. Conversely, decompression of the bladder enables the self-contained module to rise again.

Figure 13:
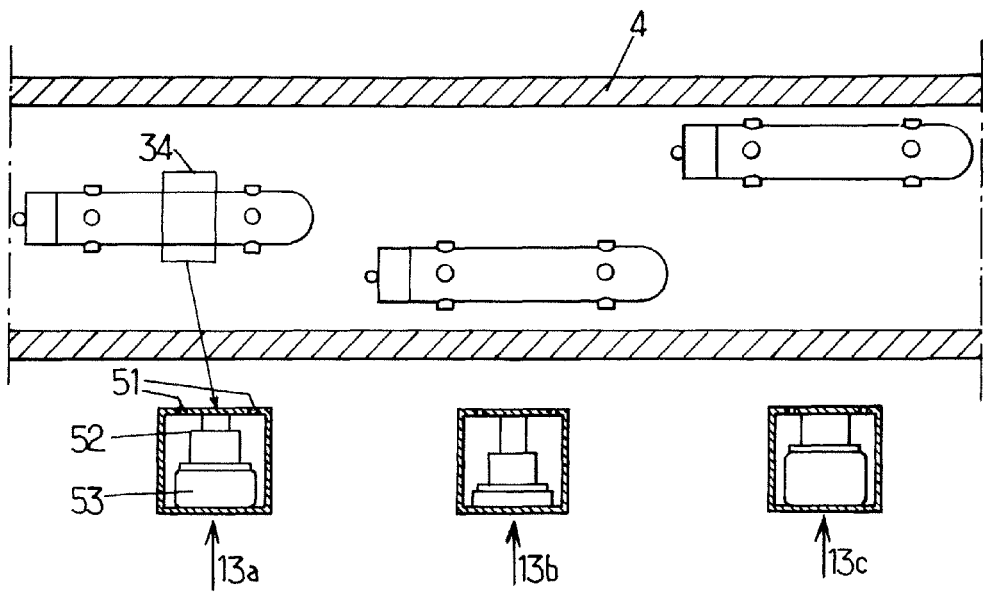
FIG. 13 is a diagram showing, in plan view, a self-contained module which is equipped with ballast so that it can move vertically.

FIG. 13 illustrates this mechanism at three successive instants. At instant 13a, the self-contained module 30 is on the axis of the pipe 4. Its deballasting stage 34 is such that the bladder of compressed air 53 contains a certain quantity of air.

At instant 13b, water has been introduced into the deballasting stage 34 via the water intakes 51, whereas the air contained in the bladder 53 was compressed by the piston 52. This has caused the self-contained module 30 to descend in the pipe 4.

At instant 13c, the air contained in the bladder 53 has been decompressed, and has evacuated the water which filled the deballasting stage 34. This has caused the self-contained module 30 to rise in the pipe 4.

These movement components of the self-contained module, or other, can be used for example to recentre the self-contained module 30 in the pipe 4. In particular, this recentring can follow recognition of decentring, following position measurements by the self-contained module, as explained above.

The recentring can advantageously be controlled by an on-board management system in the self-contained module, using software including taking position measurements, processing them, comparing them with a threshold and acting on the movement components.

The movement components of the self-contained module can also be used to take account of certain situations, such as a jamming of the self-contained module. As an illustration, the self-contained module can move to go round an obstacle, e.g. by approaching a wall of the pipe rather than remaining at the centre. There too, software can make it possible to manage this type of situation.

If appropriate, a position modification order can come from outside the self-contained module, e.g. by transmission of an appropriate signal from outside the pipe or from a signal source placed in the pipe and near an access point. In this case, the self-contained module must be capable of receiving and interpreting this signal, as will be explained below.

The self-contained module can advantageously be used to obtain information about the pipe inside which it moves. When this pipe is part of a network of pipes and the self-contained module moves in this network, from pipe to pipe, the information which is obtained can relate to the configuration of all or part of the network.

For this purpose, the self-contained module 30 can include, e.g. in its stage 39, an inertial unit which is capable of estimating its trajectory, in terms of rise and fall, and its changes of direction.

These measurements, advantageously time-stamped, can be stored by the self-contained module 30, e.g. in its stage 36. Later, after being put into correspondence with the curvilinear position of the self-contained module 30, they can be exploited to establish the profile, in plan and/or elevation, of the pipe(s) inside which the self-contained module has moved.

For more precision, the measurements taken by the inertial unit can be corrected for the effects of the actions on the rudders and ballast of the self-contained module 30.

Characterisation of a structural state can result from analysis of the vibratory response of the structure under consideration. This response is representative of the stiffness of this structure and/or of the quality of its link to other adjacent structures, and by additional analysis, can make it possible to detect and quantify any damage or discontinuities.

In the case of a pipe, damage can result from bad coherence of the ground surrounding the pipe, so that the latter, instead of being uniformly supported and to some extent constrained, has regions where its strength relies on its section alone. These regions then have a different vibratory response from that of regions for which the surrounding ground provides an additional resistant mass. In this way, gaps behind a wall can be detected by highlighting regions which "sound hollow".

The self-contained module 30 can advantageously contain a means which is liable to detect such regions of discontinuity by analysing the vibratory response of the wall of the pipe.

For example, a shock wave can be emitted by the self-contained module in the direction of the wall of the pipe by a device of the type which is used for fragmentation of stones. An element which is sensitive to the return vibration, of piezo-electric ceramic type, can also store these characteristics. This emission-reception can be done periodically in time or in distance travelled, or on an order which reaches the self-contained module.

The self-contained module 30 can also include, e.g. in its stage 39, means of measuring the static pressure in the pipe. Measurement of the total pressure, on the model of the operation of a Pitot tube, can make it possible to estimate the speed of the self-contained module relative to the fluid, and the absolute pressure of the latter.

This information, coupled to measurements of the speed of the fluid and position measurements in the pipe, can make it possible to establish, by calculation, the longitudinal profile of the pipe (elevation of the pipe).

In particular, it could make it possible to detect bad profiles following bad installation of the pipe, or settlement of the pipe, which are structural problems which greatly affect the lifetime of the pipe.

The self-contained module 30 can also include, e.g. in its stage 39, one or more magnetometers which are capable of detecting the presence of magnetic elements, e.g. of steel, such as joints or valves.

These measurements, time-stamped and stored, can then make it possible to locate these features of the pipe or network of pipes on the curvilinear abscissa.

Thus, with the means of measuring advantageously on board the self-contained module, it is possible, by means of resetting all the data temporally and then linearly, to know, for the pipe(s) inside which the self-contained module has moved:

the geometrical characteristics of the pipe(s) (diameter, ovality, fouling, furring), with a precision depending on the number of sonars; and/or the characteristics of internal roughness, and in particular the joints between pipe elements; and/or the layout of the pipe(s) in plan and in elevation; and/or the presence of a magnetic element in the pipe(s); and/or the pressure at various points of the pipe(s); and/or the speed of flow at various points of the pipe(s) (by compounding the speed of the self-contained module, the pressure measurement and knowledge of the section).

Obtaining other information is of course also conceivable.

As mentioned above, the self-contained module 30 can include, e.g. within its stage 37, means of transmitting and/or receiving signals, e.g. acoustic.

Advantageously, the self-contained module 30 has on board means of receiving and understanding command signals from an access point. These signals can be acoustic, electromagnetic (e.g. radio) or other signals.

As an example, the access point 8 can include an emitter of an acoustic signal into the fluid 28. The emitted sound has a frequency content which is specific to the command associated with it, so that the command is unambiguous when it is received by the self-contained module and is not comparable to any other sound resulting from a leak or from the management of the network (flow, water hammer, etc.).

The commands can relate to, for example:

a change of direction or altitude; and/or a request for emission of a specific sound from the self-contained module; and/or an increase of the power of emission from the self-contained module; and/or a change of the storing conditions.

Other information is of course also conceivable. Thus any information which is liable to modify the current method of operation of the self-contained module can be envisaged.

Following reception of a command, the self-contained module may send back an acoustic signal to acknowledge reception. It is thus possible to be sure that the emitted command has actually been received and therefore, presumably, executed.

Reception of the sound of a marker emitter by the self-contained module can also make it possible to reset its advance.

Other emitters can be installed at intervals on or in the pipe.

The means of receiving acoustic signals can be the same as the data acquisition means which are used to detect a leak or obtain other information relating to the pipe. For example, the same microphone can fulfil both functions. As a variant, these means could be distinct.

Advantageously, the self-contained module 30 has on board means of transmitting signals. As for reception, the transmitted signals can be acoustic, electromagnetic (e.g. radio) or other signals.

As an example, the signals can be characteristic sounds. The means of transmission are, for example, arranged so that the transmitted sounds can be interpreted unambiguously by a reception system.

According to one method of operation, the reception system(s) is/are placed inside the pipe, e.g. near an access point or along the layout of the pipe. Via the acoustic channel of the fluid, they receive a regular beep emitted by the self-contained module.

When the self-contained module advances in the pipe, the sound is received by a receiver near the access point by which this module was introduced into the pipe, with increasing time intervals. This time increase results from the movement away of the self-contained module, and makes it possible to measure the distance from the self-contained module to the receiver (Doppler effect). This increase can also result from the difference of transmission speed in the fluid.

If these time intervals remain constant, it is because the self-contained module is jammed.

If they diminish, this corresponds to a diminution of the average speed of the fluid between the self-contained module and the receiver. This situation can only occur by a voluntary action (reduction of flow rate) by a operator, which is otherwise known and directly interpretable.

This analysis (verification of the time interval) can thus constitute information about the good advance/return of the self-contained module. This can be additional or alternative to what is obtained by measuring the unwinding/winding of the cable.

The signal, e.g. acoustic, which the self-contained module transmits is advantageously characteristic of one of its states. Operation is then similar to that of sending a command, as mentioned above. This sound may be such that it cannot be confused with an beep for advancing, e.g. by its frequency content.

Thus, a sound emitted by the self-contained module can characterise:
  good reception of an instruction; and/or
  the impossibility of executing this instruction; and/or
  a simple state; and/or
  an alert on the capacity of the battery; and/or
  an alert on the capacity of the memory; and/or
  wedging (e.g. according to a self-diagnostic algorithm); and/or
  a value or class of tensile stress on the cable.

Other situations can of course result in emission of a characteristic sound.

According to another method of operation, mentioned above, the signals, e.g. acoustic, which the self-contained module transmits can be detected from outside the pipe. This can be achieved using appropriate means such as a microphone which can be placed on the outside of the pipe. Taking account of the attenuation, the sound is then detected only near the microphone, as it approaches or moves away. In this case, the microphone constitutes an advance marker.

The sound can also be monitored from outside the pipe, by an operator with a portable microphone or other reception system. In the case of a buried pipe, if the emission is powerful enough to pass through the different interfaces of the pipe and the soil, it is then possible to monitor the movement of the self-contained module.

Also in this method of operation, the transmitted signal, e.g. acoustic, can consist of a simple beep, and/or be characteristic of information which the self-contained module wishes to transmit.

Once the self-contained module 1 (or 30) has finished its course inside the pipe 4, e.g. because the mechanical link 2 has been entirely delivered from the reel 5, the self-contained module 1 (or 30) is advantageously extracted from the pipe 4.

This recovery can be done by pulling on the mechanical link 2, e.g. by rewinding it on the reel 5, until the self-contained module 1 (or 30) has left the pipe 4 through the access point 8. The device 7 mentioned above can contribute to exerting the necessary traction on the mechanical link 2. When it returns, the mechanical link 2 is always stretched, because all the forces resulting from friction, whether it is the mechanical link 2 against the pipe 4 or the fluid 28 against the mechanical link 2, oppose this movement.

Thanks to this recovery, the self-contained module 1 (or 30) can be reused later. Also, since this self-contained module 1 (or 30) does not remain inside the pipe 4, it does not risk plugging the latter, or possibly polluting the fluid 28 which it contains.

When the self-contained module 1 (or 30) circulates inside the pipe 4, in the reverse direction to the fluid flow 28, by the effect of traction on the mechanical link 2, data acquisition and storing can be achieved according to the same principles as those described above. It is thus possible to have a double acquisition, according to the two directions of circulation of the self-contained module 1 (or 30) inside the pipe 4.

Of course, simple acquisition in only one of the two directions of circulation of the self-contained module 1 (or 30) inside the pipe 4 could be implemented.

The length of the mechanical link which is extracted from the pipe by traction can be measured using appropriate means, which may or may not be the same as the measurement means 6 described above.

Once the self-contained module 1 (or 30) has been extracted from the pipe 4, the data which it has acquired and stored can be analysed. This analysis is thus subsequent to the data acquisition, contrary to the analysis in real time provided by the Sahara solution described in the introduction.

This data analysis can be done according to traditional techniques.

When the acquired and stored data are acoustic data, this subsequent analysis can, for example, consist of detecting sounds which are characteristic of a leak of fluid within these data, such as sounds corresponding to a particular frequency.

When the acquired and stored data comprise visual data, an analysis of the detected light can be carried out, for example.

Of course, other types of analysis can be envisaged, as a function of the mode of acquisition of the data carried out by the self-contained module 1 (or 30).

When an internal clock 13 of the self-contained module 1, synchronised with an external clock, has been used as described above, it is possible to put into correspondence the different events which are detected using the acquired and stored data and the geographical position of the self-contained module 1 (which, for example, has been obtained by measuring the length of the mechanical link 2 introduced into the pipe 4, using the same time reference, as described above).

Subsequently, the portion of the pipe 4 where a leak of fluid has been detected can be excavated, with a view to an additional analysis by an operator and/or a repair if that proves to be necessary.

Other actions are also conceivable, according to the type of information collected about the pipe under consideration.

Various optional measures to improve the circulation of the self-contained module 1 (or 30) inside the pipe 4 will be described below.

There are three possible states of the self-contained module 1 (or 30), when it is inside the pipe 4 which transports the fluid flow 28.

Under normal circumstances, the self-contained module 1 (or 30) advances inside the pipe 4, pushed by the fluid flow 28. In this case, its absolute speed is less than or equal to that of the fluid. In other words, its speed relative to the flow is low.

It can also happen that the self-contained module 1 (or 30) does not move, or practically does not move, that is its absolute speed is close to zero. This behaviour is not normal, and indicates that the self-contained module 1 (or 30) is probably jammed.

This jamming can be due to an obstacle inside the pipe 4, or to friction of the mechanical link 2, the intensity of which exceeds the force resulting from the push exerted by the fluid 28. In this case, the speed of the self-contained module 1 (or 30) relative to the flow 28 is negative.

The self-contained module 1 (or 30) can go from the state in which it advances, pushed by the fluid flow 28, to the state in which it no longer moves, either sharply, or after a transition phase in which the absolute speed of the self-contained module 1 (or 30) diminishes progressively.

A third state appears when the self-contained module 1 (or 30) returns in the reverse direction to the pushing of the fluid flow 28, dragged by traction on the mechanical link 2 from outside the pipe 4. In this case, the absolute speed of the self-contained module 1 (or 30) is relatively large, since it must overcome the thrust of the fluid flow 28.

Reasoning in speed relative to the fluid flow 28, the (negative) speed of the self-contained module 1 (or 30) is greater than in the state where the self-contained module 1 (or 30) is jammed.

As a first approximation, it can be considered that the force exerted on the self-contained module 1 (or 30) depends on its form factor, its master cross-section (i.e. its transverse surface) and the square of its speed relative to the fluid flow 28.

Thus if the form factor and master cross-section of the self-contained module 1 (or 30) do not change, the force exerted on the self-contained module 1 (or 30) varies as a function of its speed relative to the fluid flow 28. This force is thus low when the self-contained module 1 (or 30) advances in the direction of the fluid flow 28. It increases if the self-contained module 1 (or 30) is jammed, and even more when the self-contained module 1 (or 30) returns in the reverse direction to the fluid flow 28.

By taking the steps of which examples will be described below, it is possible to act advantageously so that the force exerted on the self-contained module 1 (or 30) is low when it advances normally and when returns in the reverse direction to the fluid flow 28, and greater when it is stopped. In this way, the self-contained module 1 (or 30) can advance easily in normal time, but equally when it is pulled in the reverse direction to the fluid flow 28. Also, the magnitude of the force exerted on the self-contained module 1 (or 30) when it is jammed is such as to allow it to be unjammed.

In other words, the self-contained module 1 (or 30) is arranged, in this embodiment, so that the fluid flow 28 offers it maximum resistance when its speed is close to zero.

The graphic of FIG. 3 illustrates this situation using curves which are drawn in a grid of which the ordinate corresponds to the passive resistance of the fluid flow 28 on the self-contained module 1 (or 30), expressed in Newtons, and the abscissa corresponds to the absolute speed of the self-contained module 1 (or 30), expressed in metres per second.

The positive values of the speed correspond to progress of the self-contained module 1 (or 30) inside the pipe 4, in the direction of the fluid flow 28, whereas the negative values of this speed correspond to progress in the reverse direction.

The curves of FIG. 3 were obtained using the following expression for the passive resistance R of the fluid flow 28 on the self-contained module 1 (or 30):

$$R = \tfrac{1}{2}.Cx.d.S.V^2,$$

where Cx designates the drag coefficient of the self-contained module 1 (or 30), d designates the density of the fluid 28, S designates the frontal area of the self-contained module 1 (or 30), and V designates the speed of the self-contained module 1 (or 30) relative to the fluid flow 28.

To draw the curves of FIG. 3, typical values of the different parameters mentioned in the formula above have been used.

It should also be noted that the speed Va used in FIG. 3 is the absolute speed of the self-contained module 1 (or 30), in contrast to the speed V relative to the fluid flow 28 mentioned in the formula above. That being so, when the fluid flow 28 has an approximately constant speed, the absolute speed Va and relative speed V of the self-contained module 1 (or 30) correspond to each other, near to this speed of fluid flow 28.

The curve 17 represents the resistance which the fluid flow 28 opposes to the progress of the self-contained module 1 (or 30), in the absence of any particular measure.

The faster the self-contained module 1 (or 30) advances in a reverse direction to that of the fluid flow 28, the stronger this resistance is. Conversely, it becomes more and more weak as the speed of the self-contained module 1 (or 30) increases in the direction of the fluid flow 28, until it cancels itself out when the absolute speed of the self-contained module 1 (or 30) reaches the speed Vf of the fluid flow.

As for the curve 18, it corresponds to a self-contained module which is arranged according to the advantageous embodiment mentioned above.

This curve 18 shows a resistance R which decreases as the absolute speed of the self-contained module 1 (or 30) increases, until it cancels itself out when this speed reaches that of the fluid flow Vf (part "+" of the curve 18). That means a relatively low resistance when the self-contained module 1 (or 30) advances normally inside the pipe 4.

On the other side of the curve (part "−" of the curve 18), a relatively low resistance is also noticed for negative values of the absolute speed of the self-contained module 1 (or 30).

When the absolute speed of the self-contained module 1 (or 30) is close to zero (intermediate part "0" of the curve 18), the resistance R is greater. It even reaches its maximum when Va equals zero, i.e. when the self-contained module 1 (or 30) is immobile.

The curves 17 and 18 are given for illustration only. In particular, their continuous nature is not limitative; discrete values of the resistance R as a function of the speed Va can also be envisaged. Similarly, the values carried on the grid can vary according to the characteristics of the system and certain assumptions, and therefore do not in any way constitute a limitation.

There are numerous ways of obtaining the behaviour symbolised by the curve 18 rather than the curve 17, for a self-contained module 1 (or 30).

According to a first method, the self-contained module 1 (or 30) is arranged to present a maximum transverse surface (master cross-section) to the fluid flow 28 when its speed is close to zero.

This can be achieved by moving the self-contained module 1 (or 30) relative to a longitudinal axis of the pipe 4. Alternatively or in addition, this behaviour can be obtained by a modification of the shape of the self-contained module 1 (or 30).

FIGS. 4a to 4e show an example of configuration of the self-contained module 1 (or 30), which makes it possible to obtain behaviour corresponding the curve 18 of FIG. 3. The different figures correspond to situations in which the speed of the self-contained module 1 (or 30) varies.

This configuration consists of connecting the self-contained module 1 (or 30) to the mechanical link 2 via a rigid hoop 15 and a return spring 16, the purpose of which is to drag the self-contained module 1 (or 30) into the position shown in FIG. 4a. However, the force exerted by the return spring can be overcome by a sufficient opposite force.

In FIG. 4a, it is assumed that the self-contained module 1 is advancing normally inside the pipe 4, at a speed V1 which is less than or equal to that of the fluid flow 28. In this situation, the transverse surface S1 facing the fluid flow 28 equals the height of the self-contained module 1. This surface is then minimal.

In FIG. 4b, the self-contained module 1 loses speed, e.g. following friction which is produced between the mechanical link 2 and the inside of the pipe 4. The speed V2 of the self-contained module 1 is then less than the speed V1 which it had at the previous stage.

This diminution of the absolute speed of the self-contained module 1 causes the resistance of the fluid flow 28 on the self-contained module 1 to increase, as is shown by the curve 18 of FIG. 3. The increase of this resistance is such as to overcome the force of the spring 16, which causes the self-contained module 1 to rise. This rising can also be facilitated using a fin for this purpose, for example.

The rising of the self-contained module 1 causes an increase of the form factor and master cross-section of the self-contained module 1. The transverse surface S2 of the self-contained module 1 facing the fluid flow 28 is then greater than S1.

This causes an increase of the thrust exerted by the fluid flow 28 on this self-contained module 1. The consequence of it is an increase of the absolute speed of the self-contained module 1 if that is possible.

Thus any friction of the mechanical link 2 against the inside of the pipe 4 can be overcome, and the progress of the self-contained module 1 (or 30) inside the pipe 4 in the direction of the fluid flow 28 can continue.

FIG. 4c corresponds to a situation where the self-contained module 1 is jammed inside the pipe 4. In this case, the speed V3 of the self-contained module 1 is close to zero.

In this situation, the self-contained module 1 puts itself into a vertical position under the effect of the pushing exerted by the fluid flow 28. It then presents a maximum transverse surface S3 to the fluid flow 28.

This corresponds to a maximum resistance of the fluid flow 28, conforming to what was described with reference to the curve 18 of FIG. 3 (part "0").

This situation causes maximum pushing on the self-contained module 1, which is such as to relaunch it into its progress, or rather to make it swing in the other direction as described below with reference to FIG. 4d.

FIG. 4d actually corresponds to a case where traction is exerted on the mechanical link 2, with the object of extracting it from the self-contained module 1 of the pipe 4.

In this case, the absolute speed V4 of the self-contained module 1 is no longer close to zero. The self-contained module 1 swings to the left, thus offering a smaller transverse section S2 to the fluid flow 28. Consequently, the resistance of the fluid flow 28 to the self-contained module 1 diminishes.

In the course of the return of the self-contained module 1, the latter can place itself as indicated in FIG. 4e. In this case, the transverse section S1 facing the fluid flow 28 is again minimal, and the opposed resistance is therefore low.

The circulation of the self-contained module 1 inside the pipe 4, in the reverse direction to the fluid flow 28, is thus facilitated.

FIGS. 5a-5e show another type of arrangement of the self-contained module 1, making it possible to obtain behaviour corresponding to the curve 18 of FIG. 3.

In this configuration, the self-contained module 1 includes a certain number of elastic scales 20, which are fixed to the body of the self-contained module 1 via respective return springs 19.

It should be noted that any other surface element could be used, in addition to or replacing such elastic scales.

Figure 5A:
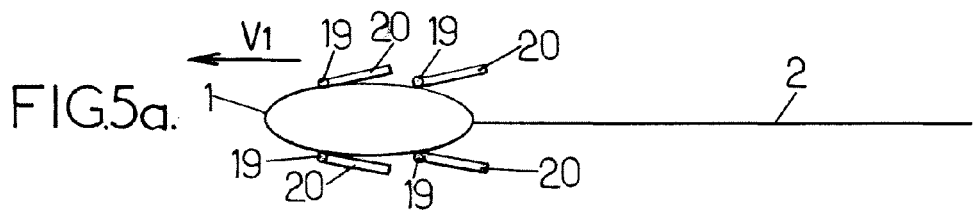
FIGS. 5a-5e are diagrams showing another advantageous example of configuration for a self-contained module, at different speeds.

By the effect of the springs 19, the scales 20 are placed against the body of the self-contained module 1 when this self-contained module 1 moves in the direction of the fluid flow 28 (FIG. 5a).

Figure 5B:
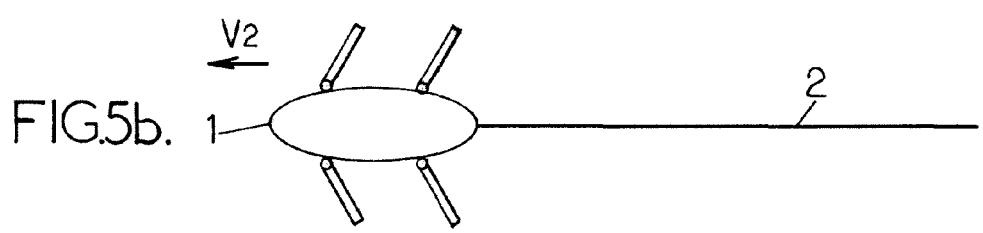

These scales 20 are deployed when the speed of the self-contained module 1 diminishes (FIG. 5b).

Figure 5C:
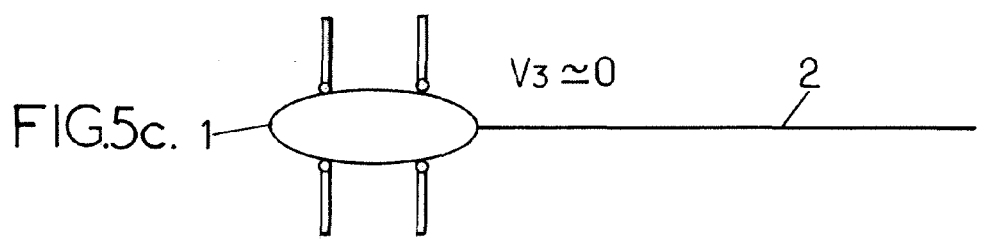
Figure 5D:
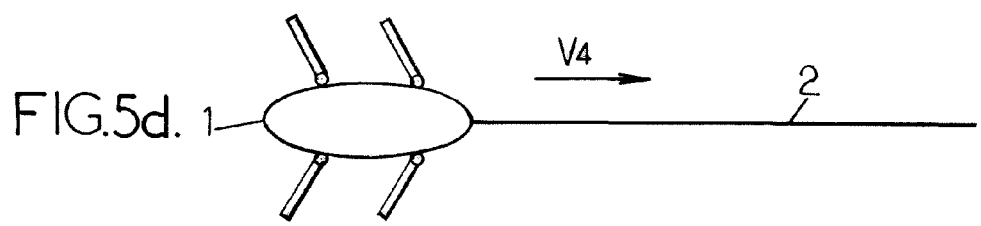

They are fully deployed, and thus present a maximum surface to the fluid flow 28, when the self-contained module 1 has a speed close to zero (FIG. 5c).

Figure 5E:
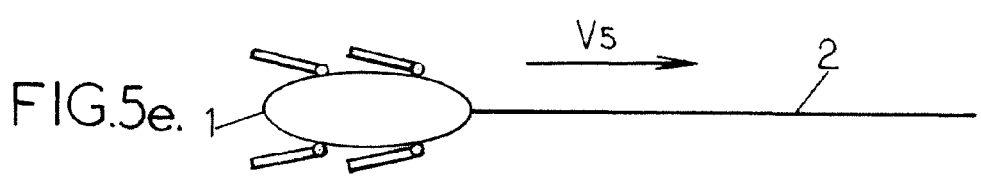

A return in the reverse direction by the self-contained module 1 overcomes the return force of the springs 19, and makes the elastic scales swing in the direction of the body of the self-contained module 1 (FIG. 5d), until these scales are placed against the body of the self-contained module 1 (FIG. 5e).

Because of this arrangement, the transverse surface which the self-contained module 1 presents to the fluid flow 28 is maximum when the speed of the self-contained module 1 is close to zero (FIG. 5c).

The self-contained module 30, equipped with scales 43 functioning in a similar way, appears in FIGS. 9a (scales 43 placed against the body of the self-contained module 30) and 9b (scales 43 deployed).

Figure 6A:
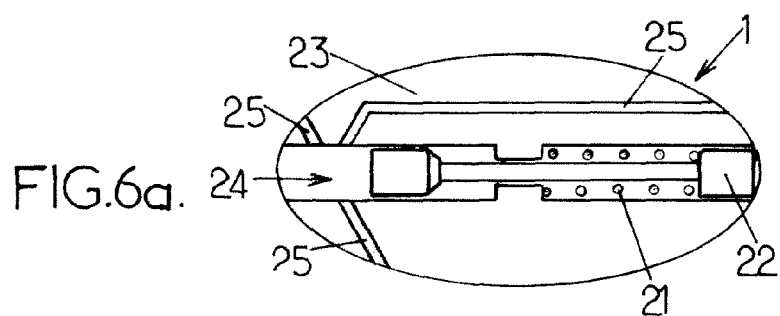
FIGS. 6a-6c are diagrams showing yet another advantageous example of configuration for a self-contained module, at different speeds.
Figure 6B:
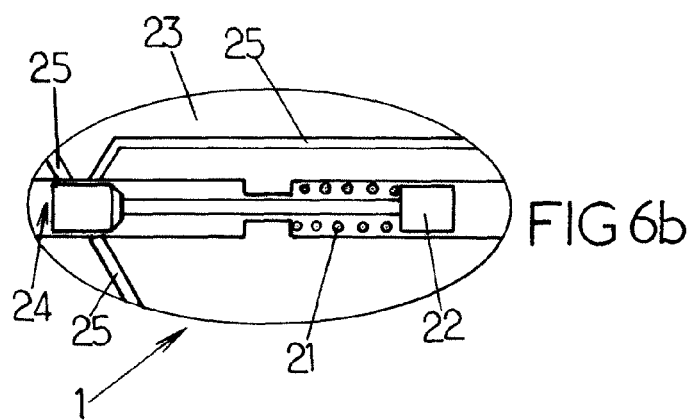
Figure 6C:
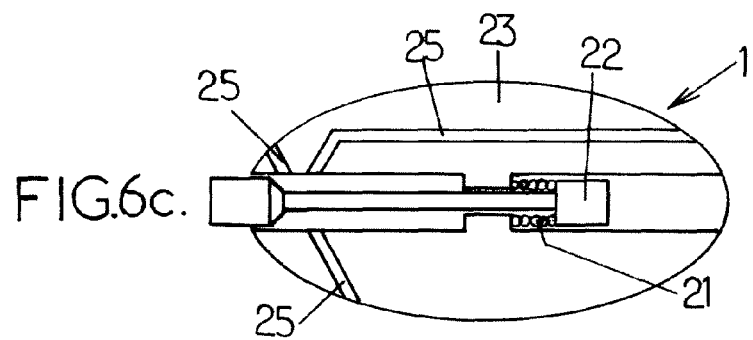

According to another method, an example of which is shown in FIGS. 6a to 6c, the self-contained module 1 (or 30) can conform to the behaviour described with reference to the curve 18 of FIG. 3, by using hydraulic fluid distribution means.

In the shown example, the self-contained module 1 includes passages 25 for the fluid 28, arranged in the body 23 of the self-contained module 1, and a mobile distribution element 22 which is placed in a housing 24 of the self-contained module 1.

In FIG. 6a, the speed of the self-contained module 1 is close to that of the fluid flow 28. In this situation, the distribution element 22 is in a position where it leaves the passages 25 open.

In FIG. 6b, the speed of the self-contained module 1 has diminished relative to FIG. 6a. The mobile distribution element 22 is pushed to the left against a spring 21, by the effect of the force exerted by the fluid flow 28.

In this new position, the mobile distribution element 22 closes all or some of the passages 25. The result is a new increase of the pushing, causing an increase of the absolute speed of the self-contained module 1 (or 30). If necessary, this may result in unjamming the self-contained module 1 (or 30).

In FIG. 6c, the self-contained module 1 is pulled in the reverse direction to the fluid flow 28, causing a new movement of the mobile distribution element 22 to the left. In this situation, the passages 25 are open again, thus causing a reduction of the resistance of the fluid flow 28 to the self-contained module 1.

Of course, other measures can be envisaged, replacing or in addition to those which have just been described, to obtain behaviour which conforms to the curve 18 of FIG. 3, or any similar behaviour.

Advantageously, the mechanical link 2 itself can be arranged to limit the friction forces with the fluid 28 and/or with the inside of the pipe 4. This makes it possible to relieve the self-contained module 1 (or 30) of the weight which it has to pull.

To do this, the mechanical link 2 can be equipped with means so that the fluid flow 28 offers it maximum resistance when its speed of movement inside the pipe 4 is close to zero.

Such means can be identical or similar to those described above for the self-contained module 1 (or 30).

Figure 7A:
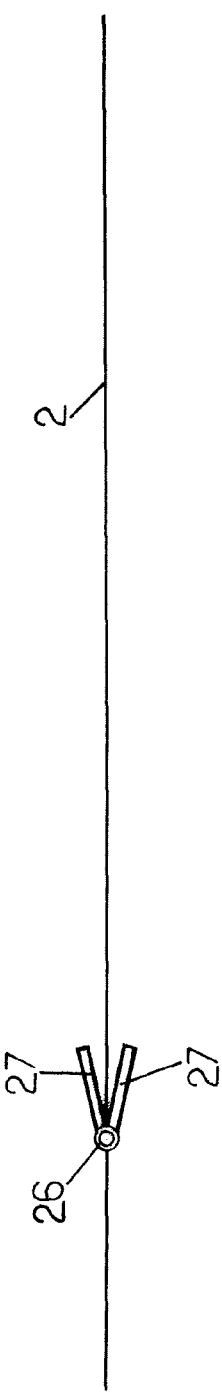
FIGS. 7a-7c are diagrams showing an advantageous example of configuration for a mechanical link, at different speeds.
Figure 7B:
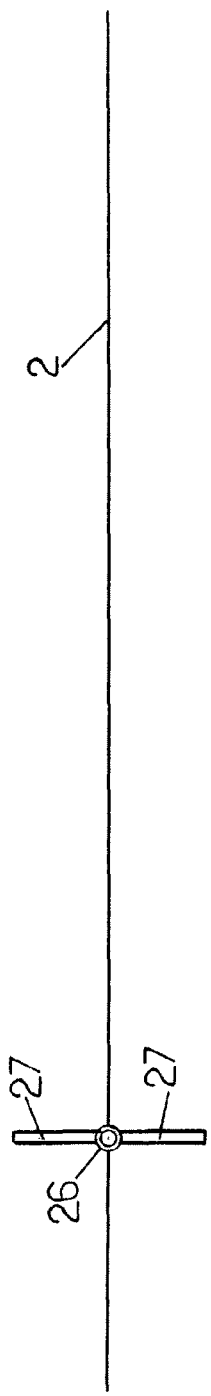

Thus in FIGS. 7a and 7b, the mechanical link 2 is for example equipped with surface elements 27, such as a flexible shape which is folded against the mechanical link 2 with the aid of a spring 26. Such surface elements 27 can be arranged at different places along the mechanical link 2.

Figure 7C:
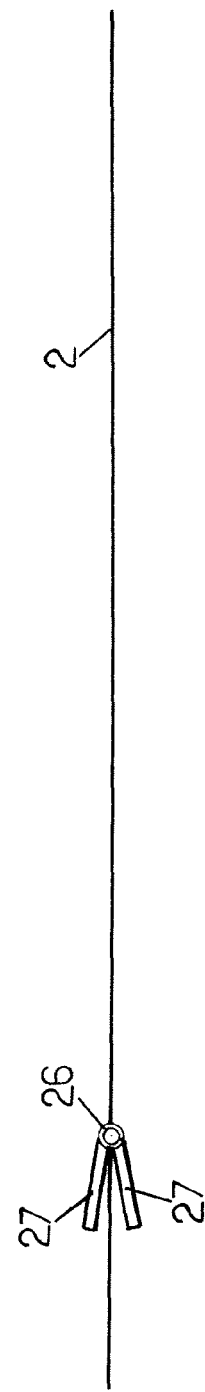

When the speed of the mechanical link 2 is non-zero, either by the effect of the progress of the self-contained module 1 (or 30) inside the pipe 4 in the direction of the fluid flow 28 (FIG. 7a), or by traction of the mechanical link 2 from outside the pipe 4 (FIG. 7c), these surface elements 27 remain approximately against the mechanical link 2 by the effect of the spring 26 or, on the contrary, because the force exerted by this spring has been overcome.

On the other hand, when the speed of the mechanical link 2 is close to zero, e.g. because the self-contained module 1 (or 30) to which it is connected is jammed, or by the effect of friction against the inside of the pipe 4, the surface elements 27 are deployed (FIG. 7b), thus offering maximum resistance to the fluid flow 28. Because of this unfolded shape, the pushing of the fluid flow 28 on the mechanical link 2 increases, and may be able to give it speed again.

There too, configuration variants of the mechanical link 2 can of course be envisaged.

What is claimed is:

1. A system for obtaining information relating to a pipe conveying a flow of fluid, and/or relating to the fluid, the system comprising:
   a module which is self-contained in terms of data storing and energy supply, comprising an acquisition unit for acquiring data, subsequent analysis of which makes it possible to obtain information relating to the pipe and/or the fluid, and memory for storing the acquired data, the self-contained module being arranged to be pushed by the fluid flow after being introduced into the pipe, and
   a tether which is connected to the self-contained module as the self-contained module is moved along the pipe and accessible from outside the pipe, said tether having no properties for transmitting the data which the self-contained module acquires to outside the pipe, and having no properties for supplying energy to the self-contained module from outside the pipe.

2. The system according to claim 1, wherein the self-contained module includes a signal transmitter and/or a signal receiver.

3. The system according to claim 1, wherein the self-contained module includes a detector for measuring the tensile stress between the self-contained module and the tether.

4. The system according to claim 1, wherein the self-contained module includes a detector for detecting a position of a side of the module relative to at least one internal wall of the pipe.

5. The system according to claim 1, wherein the self-contained module is configured to move its own position relative to the pipe in the direction of the height and/or width of the pipe.

6. The system according to claim 1, wherein the self-contained module includes at least one of: an inertial unit, a pressure sensor, a speed sensor, and a magnetometer.

7. The system according to claim 1, wherein the self-contained module includes an internal clock, which is synchronized with an external clock outside the pipe and used as a time reference.

8. The system according to claim 1, wherein the self-contained module is arranged so that after it is introduced into the pipe, the fluid flow offers variable resistance to said module as a function of speed relative to the fluid.

9. The system according to claim 1, wherein the self-contained module includes an on board current generation system.

10. The system according to claim 1, wherein the tether is arranged so that when it is inside the pipe, the fluid flow offers variable resistance to said tether as a function of speed relative to the fluid.

11. The system according to claim 1, wherein the length of the tether is of the order of ten kilometers.

12. The system according to claim 1, also including a unit for pushing and/or pulling the tether into and/or out of the pipe, arranged to overcome the stresses resulting from friction of the tether inside the pipe.

13. The system according to claim 1, further comprising a detector for measuring the length of the tether which is introduced into the pipe when the self-contained module is pushed by the fluid flow, and/or a detector for measuring the length of the tether, when the tether is extracted from the pipe by traction.

14. A method of obtaining information relating to a pipe conveying a fluid flow, and/or relating to the fluid, the method including the following steps:
   introducing into the pipe a module which is self-contained in terms of data storing and energy supply, comprising an acquisition unit for acquiring data, subsequent analysis of which makes it possible to obtain information relating to the pipe and/or the fluid, and memory for storing the acquired data, a tether which is accessible from outside the pipe, the tether being connected to the self-contained module as the self-contained module is moved along the pipe, the tether having no properties for transmitting the data which the self-contained module acquires to outside the pipe, and having no properties for supplying energy to the self-contained module from outside the pipe; and
   acquiring the data using said acquisition unit and storing said data using said memory, while the self-contained module is pushed by the fluid flow.

15. The method according to claim 14, wherein the information which is obtained about the pipe relates to detection of a leak in said pipe, and/or characteristics of said pipe.

16. The system according to claim 9, wherein the on board current generation system is a rechargeable battery.

17. The method according to claim 15, wherein the characteristics of said pipe include at least one of diameter, ovality, internal fouling, internal furring, discontinuity of an internal surface of said pipe, coherence of surrounding ground, opening of joints, profile in plan and/or elevation, the presence of a magnetic element, internal pressure, and speed of fluid flow within said pipe.

* * * * *